(12) United States Patent
Song et al.

(10) Patent No.: US 11,301,779 B2
(45) Date of Patent: Apr. 12, 2022

(54) AIR CONDITIONER

(71) Applicant: LG ELECTRONICS INC., Seoul (KR)

(72) Inventors: Taeyup Song, Seoul (KR); Dongwoo Han, Seoul (KR)

(73) Assignee: LG Electronics Inc., Seoul (KR)

(*) Notice: Subject to any disclaimer, the term of this patent is extended or adjusted under 35 U.S.C. 154(b) by 427 days.

(21) Appl. No.: 16/380,547

(22) Filed: Apr. 10, 2019

(65) Prior Publication Data
US 2019/0309978 A1 Oct. 10, 2019

(30) Foreign Application Priority Data

Apr. 10, 2018 (KR) .................. 10-2018-0041551

(51) Int. Cl.
G06N 20/00 (2019.01)
F24F 11/64 (2018.01)
(Continued)

(52) U.S. Cl.
CPC .............. G06N 20/00 (2019.01); F24F 11/30 (2018.01); F24F 11/56 (2018.01); F24F 11/58 (2018.01);
(Continued)

(58) Field of Classification Search
CPC .......... G06N 20/00; G06N 3/08; G05B 15/00; G05B 15/02; F24F 11/58; F24F 11/30;
(Continued)

(56) References Cited

U.S. PATENT DOCUMENTS 4,938,033 A * 7/1990 Ogihara ............. B60H 1/00842
165/202
2009/0090125 A1* 4/2009 Seki ......................... F24F 11/79
62/407
(Continued)

FOREIGN PATENT DOCUMENTS

CN 101520222 9/2009
CN 101769571 7/2010
(Continued)

OTHER PUBLICATIONS

Partial European Search Report in European Application No. 19167883.8, dated Aug. 20, 2019, 13 pages.
(Continued)

Primary Examiner — Thomas C Lee
Assistant Examiner — Michael Tang
(74) Attorney, Agent, or Firm — Fish & Richardson P.C.

(57) ABSTRACT

A method of operating an air conditioner, including: obtaining an image acquired by a camera; determining a distance and a direction of an occupant relative to the air conditioner, based on the image; using at least one machine-learning network to classify an air-blowable space of the air conditioner into an intensive air blowing area and a non-intensive air blowing area, based on the distance and the direction of the occupant; controlling the air conditioner to operate in an intensive operation mode with respect to the intensive air blowing area; and controlling the air conditioner to operate in a non-intensive operation mode with respect to the intensive air blowing area and the non-intensive air blowing area based on completion of the intensive operation mode. A time duration of the intensive operation mode is smaller than a time duration of the non-intensive operation mode.

18 Claims, 20 Drawing Sheets

(51) Int. Cl.
  *F24F 11/65* (2018.01)
  *G05B 15/02* (2006.01)
  *F24F 11/58* (2018.01)
  *F24F 11/30* (2018.01)
  *F24F 11/56* (2018.01)
  *F24F 11/79* (2018.01)
  *G05B 15/00* (2006.01)
  *F24F 120/12* (2018.01)
  *F24F 11/46* (2018.01)
  *F24F 110/10* (2018.01)
  *F24F 11/77* (2018.01)
  *F24F 140/40* (2018.01)
  *F24F 140/60* (2018.01)
  *F24F 110/20* (2018.01)

(52) U.S. Cl.
  CPC .............. *F24F 11/64* (2018.01); *F24F 11/65* (2018.01); *F24F 11/79* (2018.01); *G05B 15/00* (2013.01); *G05B 15/02* (2013.01); *F24F 11/46* (2018.01); *F24F 11/77* (2018.01); *F24F 2110/10* (2018.01); *F24F 2110/20* (2018.01); *F24F 2120/12* (2018.01); *F24F 2140/40* (2018.01); *F24F 2140/60* (2018.01)

(58) Field of Classification Search
  CPC .. F24F 11/56; F24F 11/79; F24F 11/64; F24F 11/65; F24F 11/77; F24F 2140/40; F24F 2140/60; F24F 2110/20; F24F 2120/12; F24F 11/46; F24F 2110/10; F24F 2110/12; F24F 2120/20; Y02B 30/70; G06K 9/00335
  See application file for complete search history.

(56) References Cited

U.S. PATENT DOCUMENTS

| | | | | |
|---|---|---|---|---|
| 2009/0210193 A1* | 8/2009 | Nagase | ..................... | F24F 11/30 702/152 |
| 2010/0063636 A1* | 3/2010 | Matsumoto | .............. | F24F 11/30 700/276 |
| 2010/0138048 A1 | 6/2010 | Park et al. | | |
| 2010/0168922 A1* | 7/2010 | Park | ......................... | F24F 11/30 700/276 |
| 2010/0175399 A1* | 7/2010 | Choi | ........................ | F24F 13/20 62/186 |
| 2011/0130881 A1* | 6/2011 | Nanami | ................... | G05B 15/02 700/277 |
| 2011/0231019 A1* | 9/2011 | Nanami | ............... | G05B 19/042 700/277 |
| 2013/0255909 A1* | 10/2013 | Matsumoto | .............. | F24F 11/30 165/11.1 |
| 2014/0277757 A1* | 9/2014 | Wang | ....................... | F24F 11/30 700/276 |
| 2015/0096318 A1* | 4/2015 | Matsumoto | .............. | F24F 11/79 62/125 |
| 2016/0110602 A1* | 4/2016 | Chujo | ....................... | F24F 11/62 382/103 |
| 2017/0314799 A1* | 11/2017 | LeRoy | ...................... | F24F 11/62 |
| 2018/0165546 A1* | 6/2018 | Skans | ................... | G06N 3/0454 |
| 2018/0195752 A1* | 7/2018 | Sasaki | ...................... | F24F 11/80 |
| 2021/0000996 A1* | 1/2021 | Kitagawa | ................ | G10L 25/51 |

FOREIGN PATENT DOCUMENTS

| | | | |
|---|---|---|---|
| CN | 107062552 A * | 8/2017 | |
| CN | 107421070 | 12/2017 | |
| CN | 107631439 | 1/2018 | |
| CN | 107860100 | 3/2018 | |
| EP | 2206983 | 7/2010 | |
| EP | 2339250 A2 * | 6/2011 | ............. F24F 11/79 |
| EP | 2194330 | 6/2019 | |
| JP | 2010255948 | 11/2010 | |
| KR | 19950008738 | 8/1995 | |
| KR | 1020090033210 | 4/2009 | |
| KR | 1020110075475 | 7/2011 | |
| KR | 1020180007054 | 1/2018 | |
| KR | 20190019737 | 2/2019 | |
| KR | 1020190019737 | 2/2019 | |
| WO | WO-2008066311 A1 * | 6/2008 | ............ F24F 1/0007 |

OTHER PUBLICATIONS

Chinese Office Action in Chinese Appln. No. 201910284399.3, dated Oct. 10, 2020, 21 pages (with English translation).

* cited by examiner

FIG. 20
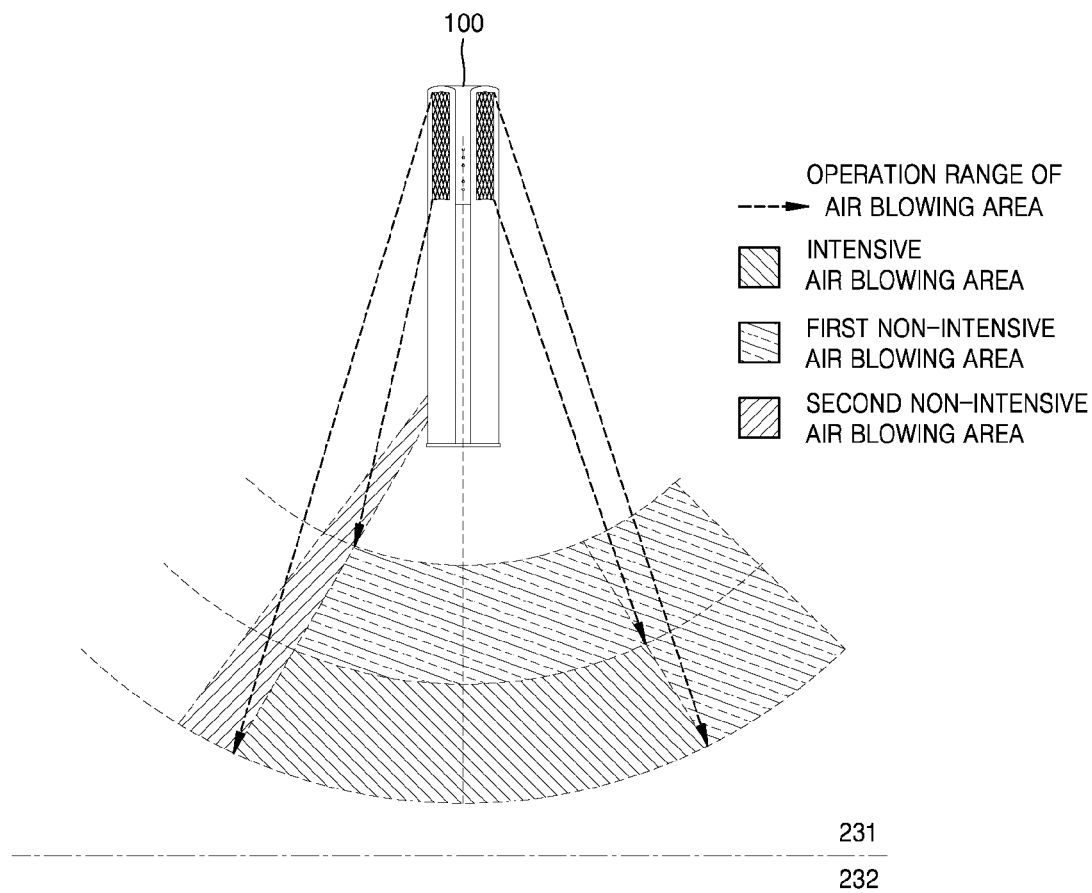
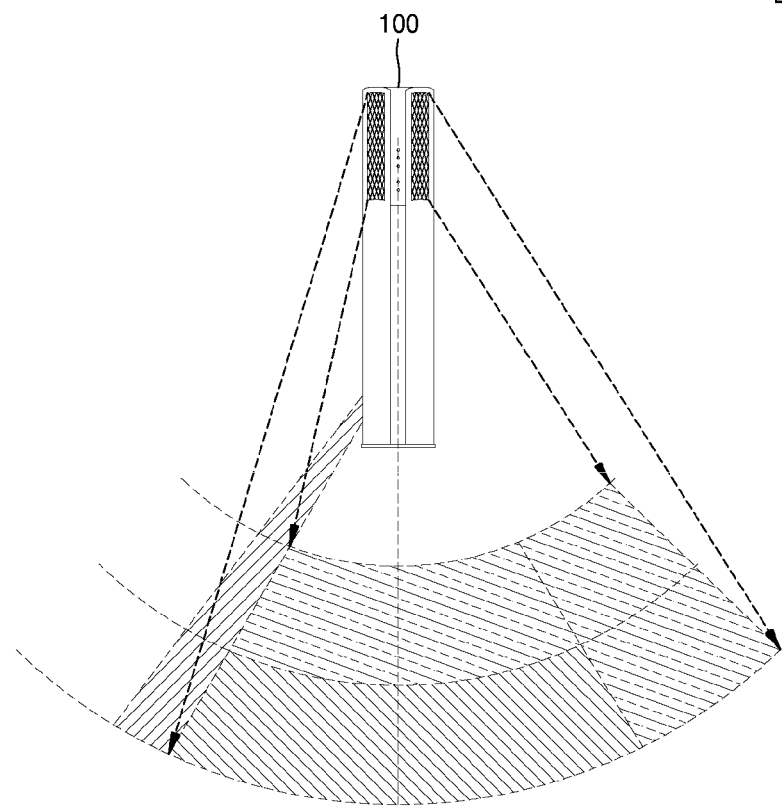

AIR CONDITIONER

CROSS-REFERENCE TO RELATED APPLICATIONS

This application claims priority under 35 U.S.C. § 119 to Korean Application No. 10-2018-0041551, filed on Apr. 10, 2018, the entire disclosure of which is herein incorporated by reference.

TECHNICAL FIELD

The present disclosure generally relates to an air conditioner.

BACKGROUND

An air conditioner is generally configured to provide a more comfortable indoor environment by discharging cold air into an indoor space, adjusting an indoor temperature, and/or purifying indoor air.

SUMMARY

One general aspect of the present disclosure includes an air conditioner including: at least one camera. The air conditioner also includes at least one processor; and at least one computer memory operably connectable to the at least one processor and storing instructions that, when executed by the at least one processor, perform operations including: obtaining at least one image acquired by the at least one camera. The operations also include determining a distance and a direction of an occupant relative to the air conditioner, based on the at least one image. The operations also include using at least one machine-learning network to classify an air-blowable space of the air conditioner into an intensive air blowing area and a non-intensive air blowing area, based on the distance and the direction of the occupant relative to the air conditioner. The operations also include controlling the air conditioner to operate in an intensive operation mode with respect to the intensive air blowing area. The operations also include controlling the air conditioner to operate in a non-intensive operation mode with respect to the intensive air blowing area and the non-intensive air blowing area based on completion of the intensive operation mode. A time duration associated with the intensive operation mode is smaller than a time duration associated with the non-intensive operation mode. Other embodiments of this aspect include corresponding computer systems, apparatus, and computer programs recorded on one or more computer storage devices, each configured to perform the actions of the methods.

Implementations may include one or more of the following features. The air conditioner where the operations further include: using the at least one machine-learning network to identify a presence of the occupant in the at least one image acquired by the at least one camera. The air conditioner wherein the operations also include using the at least one machine-learning network to determine the distance and the direction of the occupant relative to the air conditioner based on the at least one image. The air conditioner wherein the operations may also include using the at least one machine-learning network to identify an activity area with respect to a plurality of areas based on the distance and the direction of the occupant relative to the air conditioner. The air conditioner where the at least one machine-learning network includes at least one artificial neural network that is pre-learned through machine learning, and where the operations further include: generating histogram values corresponding to the plurality of areas by accumulating a result of the distance and the direction of the occupant. The air conditioner where the operations may also include using the at least one artificial neural network to process the histogram values as input data to classify the air-blowable space into the intensive air blowing area and the non-intensive air blowing area. The air conditioner where the operations further include: using the at least one machine-learning network to classify the non-intensive air blowing area into an intermittent air blowing area and an non-air blowing area. The air conditioner may further includes an air blowing unit including a left vane and a right vane, and the operations may further include: independently controlling the left vane and the right vane of the air blowing unit to supply air with respect to the intensive air blowing area and the non-intensive air blowing area. The air conditioner where the operations further include: based on a determination that there is no intensive air blowing area in the air-blowable space, controlling the air conditioner to operate in an intensive operation mode in which the left vane and the right vane operate in a state of being fixed toward a central direction of the air conditioner. The air conditioner where the operations further include: based on a determination that the intensive air blowing area includes a left intensive air blowing area and a right intensive air blowing area, and that the left intensive air blowing area and the right intensive air blowing area are not continuous. The air conditioner where the operations may also include controlling the left vane to blow air to the left intensive air blowing area, and controlling the right vane to blow air to the right intensive air blowing area. The air conditioner where the operations further include: based on a determination that an angle at which the left vane or the right vane rotates with respect to the intensive air blowing area or the non-intensive air blowing area is less than a threshold angle: fixing the left vane or the right vane toward the intensive air blowing area or the non-intensive air blowing area, and based on a determination that there is no intensive air blowing area in the air-blowable space of the air conditioner: controlling the left vane and the right vane to swing. The air conditioner where independently controlling the left vane and the right vane includes: controlling the left vane to blow air to a left area, and controlling the right vane to blow area to a right area; and based on a determination that any one of the left area or the right area is not included in the intensive air blowing area: controlling the any one of the left vane or the right vane to be fixed toward a central direction of the air conditioner. The air conditioner where independently controlling the left vane and the right vane includes: determining that the intensive air blowing area includes (i) a left intensive air blowing area in which a first wind direction is determined by control of the left vane, and (ii) a right intensive blowing area in which a second wind direction is determined by control of the right vane. The air conditioner where the operations may also include controlling a left wind direction by adjusting the left vane toward the left intensive air blowing area, and controlling a right wind direction by adjusting the right vane toward the right intensive air blowing area. The air conditioner where the operations further include: based on a determination of the intensive air blowing area, controlling the air conditioner to operate in the intensive operation mode, with respect to the intensive air blowing area, for a first period of time. The air conditioner where he operations may also include based on termination of the intensive operation mode, controlling the air conditioner to operate in the non-intensive operation mode with respect to the non-intensive air blowing area and the intensive air blowing area. The air conditioner where a first amount of energy consumed per unit time during the intensive operation mode is greater than a second amount of energy consumed per unit time during the non-intensive operation mode. The air conditioner may further include a sensing unit configured to sense a change in a temperature or a humidity of the air blowing area, and the operations may further include: generating a parameter corresponding to at least one of (i) locations and areas of the non-intensive air blowing area and the intensive air blowing area, (ii) an initial indoor temperature at a start time of a section in which the air conditioner operates in the intensive operation mode, (iii) a target setup temperature of the section, (iv) a temperature change rate of a predetermined initial section of the section, (v) a temperature change rate of the section, or (vi) a time scale between a start time point and an end time point of the section. The air conditioner where the operations may also include controlling the air conditioner to operate in the intensive operation mode for a predetermined period of time with respect to the intensive air blowing area based on an activation time point, where the activation time point is at least one of (i) a turn-on time of the air conditioner, or (ii) a starting time of an automatic operation mode of air-conditioner without user control. The air conditioner where the operations may also include controlling the air conditioner to operate in the non-intensive operation mode with respect to the non-intensive air blowing area and the intensive air blowing area based on the intensive operation mode being terminated. Implementations of the described techniques may include hardware, a method or process, or computer software on a computer-accessible medium.

Another general aspect includes a cloud server configured to implement an area-selective operation of an air conditioner, the cloud server including: a communication unit configured to transmit and receive information to and from the air conditioner. The cloud server also includes at least one processor; and at least one computer memory operably connectable to the at least one processor and storing instructions that, when executed by the at least one processor, perform operations including: receiving, from the air conditioner via the communication unit, information related to a distance and a direction of an occupant relative to the air conditioner; using at least one machine-learning network to classify air blowing areas of the air conditioner into an intensive air blowing area and a non-intensive air blowing area, based on the information related to the distance and the direction of the occupant relative to the air conditioner; and instructing the air conditioner to operate, after the air conditioner operates in an intensive operation mode with respect to the intensive air blowing area, in a non-intensive operation mode with respect to the intensive air blowing area and the non-intensive air blowing area. Other embodiments of this aspect include corresponding computer systems, apparatus, and computer programs recorded on one or more computer storage devices, each configured to perform the actions of the methods.

Implementations may include one or more of the following features. The cloud server where the information related to the distance and the direction of the occupant relative to the air conditioner includes at least one image acquired by at least one camera disposed in the air conditioner, and where the operations further include: using the at least one machine-learning network to identify a presence of the occupant in the at least one image. The cloud server where the operations may also include using the at least one machine-learning network to determine the distance and the direction of the occupant relative to the air conditioner based on the at least one image. The cloud server where the operations may also include using the at least one machine-learning network to identify an activity area with respect to a plurality of areas based on the distance and the direction of the occupant relative to the air conditioner. The cloud server where the at least one machine-learning network includes at least one artificial neural network that is pre-learned through machine learning, and where the operations further include: generating histogram values corresponding to the plurality of areas by accumulating a result of the distance and the direction of the occupant. The cloud server where the operations may also include using the at least one artificial neural network to process the histogram values as input data to classify the air-blowable space into the intensive air blowing area and the non-intensive air blowing area. The cloud server where the operations further include: using the at least one machine-learning network to classify the non-intensive air blowing area into an intermittent air blowing area and an non-air blowing area. The cloud server where the operations further include: instructing the air conditioner to operate in the intensive operation mode for a predetermined period of time with respect to the intensive air blowing area based on an activation time point, where the activation time point is at least one of (i) a turn-on time of the air conditioner, or (ii) a starting time of an automatic operation mode of air-conditioner without user control. The cloud server where the operations may also include instructing the air conditioner to operate in the non-intensive operation mode with respect to the non-intensive air blowing area and the intensive air blowing area based on the intensive operation mode being terminated. The cloud server where the operations may also include where instructing the air conditioner to operate in the intensive mode operation and the non-intensive mode operation is based on at least one of (i) locations and areas of the non-intensive air blowing area and the intensive air blowing area, (ii) an initial indoor temperature at a start time of a section in which the air conditioner operates in the intensive operation mode, (iii) a target setup temperature of the section, (iv) a temperature change rate of a predetermined initial section of the section, (v) a temperature change rate of the section, or (vi) a time scale between a start time point and an end time point of the section. Implementations of the described techniques may include hardware, a method or process, or computer software on a computer-accessible medium.

Another general aspect includes a method of operating an air conditioner, including: obtaining at least one image acquired by at least one camera. The method of operating also includes determining a distance and a direction of an occupant relative to the air conditioner, based on the at least one image. The method of operating also includes using at least one machine-learning network to classify an air-blowable space of the air conditioner into an intensive air blowing area and a non-intensive air blowing area, based on the distance and the direction of the occupant relative to the air conditioner. The method of operating also includes controlling the air conditioner to operate in an intensive operation mode with respect to the intensive air blowing area. The method of operating also includes controlling the air conditioner to operate in a non-intensive operation mode with respect to the intensive air blowing area and the non-intensive air blowing area based on completion of the intensive operation mode. The method of operating also includes where a time duration associated with the intensive operation mode is smaller than a time duration associated with the non-intensive operation mode. Other embodiments of this aspect include corresponding computer systems, apparatus, and computer programs recorded on one or more computer storage devices, each configured to perform the actions of the methods.

Implementations may include one or more of the following features. The method further including: using the at least one machine-learning network to identify a presence of the occupant in the at least one image acquired by the at least one camera. The method may also include using the at least one machine-learning network to determine the distance and the direction of the occupant relative to the air conditioner based on the at least one image. The method may also include using the at least one machine-learning network to identify an activity area with respect to a plurality of areas based on the distance and the direction of the occupant relative to the air conditioner. The method where the at least one machine-learning network includes at least one artificial neural network that is pre-learned through machine learning, and where the method further includes. The method may also include generating histogram values corresponding to the plurality of areas by accumulating a result of the distance and the direction of the occupant. The method may also include using the at least one artificial neural network to process the histogram values as input data to classify the air-blowable space into the intensive air blowing area and the non-intensive air blowing area. The method may also include Implementations of the described techniques may include hardware, a method or process, or computer software on a computer-accessible medium.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 20 shows an example of operations of an air blowing unit corresponding to an intensive operation mode and a non-intensive operation mode according to the present disclosure.

DETAILED DESCRIPTION

In some scenarios, an air conditioner includes an indoor unit installed in an indoor space and an outdoor unit which is composed of a compressor, a heat exchanger, etc. to supply refrigerant to the indoor unit.

In some air conditioners, the indoor unit and the outdoor unit can be controlled separately from each other. At least one indoor unit may be connected to the outdoor unit, and the air conditioner may operate in a cooling or heating mode by supplying refrigerant to the at least one indoor unit according to a requested operation state.

In relation to user's convenience, techniques for controlling the air conditioner suitably for a temperature preferred by the user may be implemented.

Figure 1:
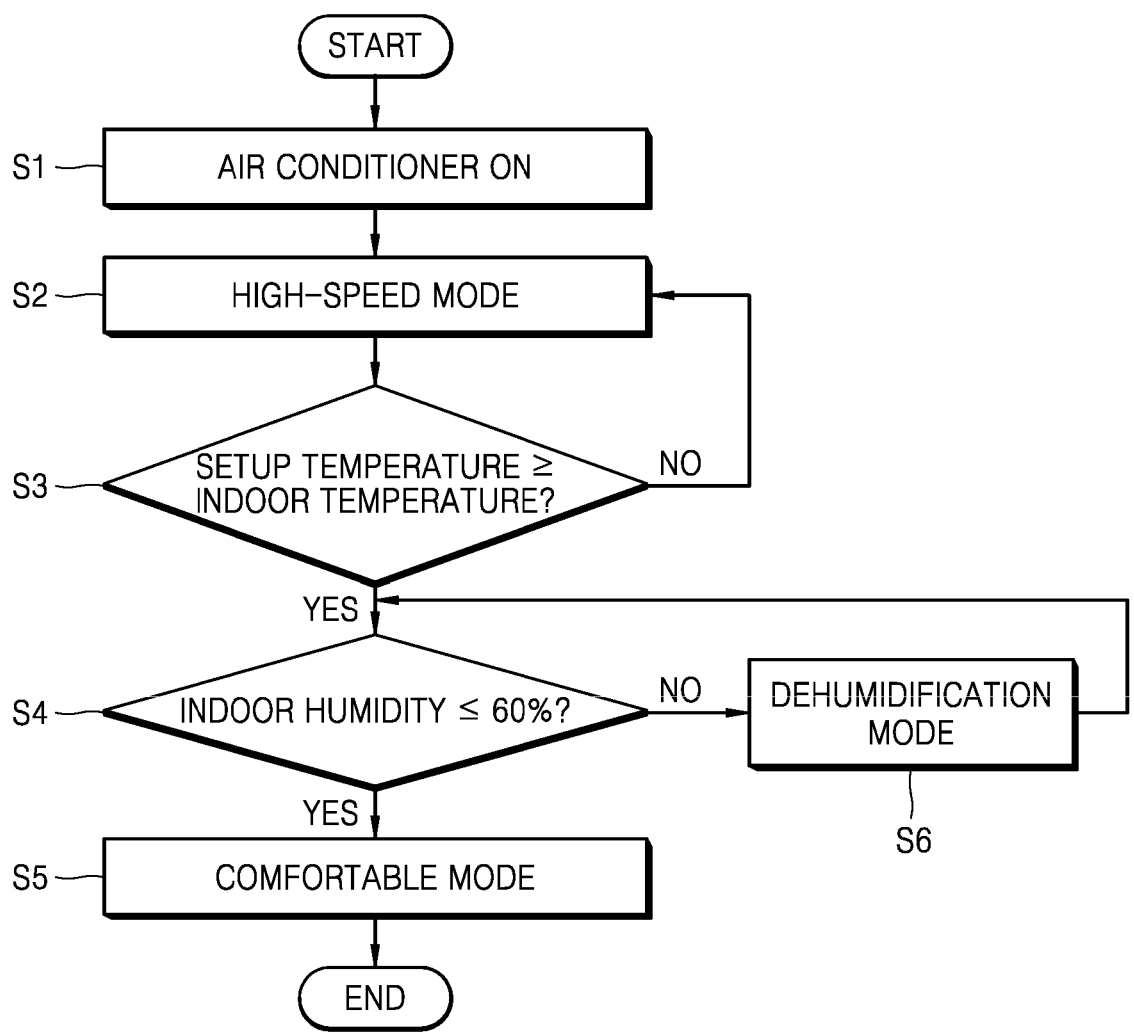
FIG. 1 shows an example of an operation process of an air conditioner operating in a high-speed mode and a comfortable mode.

FIG. 1 shows an example of an operation process of an air conditioner operating in a high-speed mode and a comfortable mode. When the air conditioner is turned on (S1), the air conditioner operates in a high-speed mode (or a high-speed section) according to a predetermined setup temperature Ts (S2). At this time, the setup temperature Ts can be automatically set according to a user's selection or a predetermined condition.

The high-speed mode is a configuration for quickly cooling (or heating) a space. Then, in the high-speed mode, the air conditioner operates with a maximum cooling capacity to quickly cool (or heat) an indoor space. In this process, the setup temperature is compared to an indoor temperature (S3). When the setup temperature is reached, indoor humidity is checked (S4). When the indoor humidity is greater than a predetermined value, the air conditioner operates in a dehumidification mode (S6). When the indoor humidity is equal to or less than the predetermined value, the air conditioner operates in the comfortable mode (S5).

Here, the comfortable mode (or a comfortable section) means that the air conditioner operates on the basis of a new setup temperature Tsa higher than the setup temperature Ts. The comfortable mode includes an operation having a power saving function for maintaining a comfortable cooling (or heating) by sensing an environment and adjusting a cooling load accordingly. This operation proposes the air conditioner to operate in the high-speed mode at first for a certain time period after the air conditioner is turned on, and then to switch the high-speed mode to the comfortable mode when the temperature reaches a predetermined temperature.

However, in some scenarios, the comfortable mode and the high-speed mode may have limitations in that the modes may fail to dynamically adapt to changes in a surrounding environment. For example, there may be numerous variables that would affect operations of the high-speed mode and comfortable mode, such as a temperature change, the number of occupants, a location where an occupant resides, humidity and the like. However, challenges may arise in scenarios where the comfortable mode and the high-speed mode are limited in reflecting the variables and/or changes in those variables.

In some scenarios, a plurality of indoor unit of an air conditioner may operate in a specific area or space, and performance of the air conditioner may be improved by collecting information derived from operations of a plurality of indoor units. Accordingly, in some implementations of the present disclosure, techniques are disclosed for controlling each indoor unit to operate in an optimum manner in various operation modes based on target areas by using the information derived from the operations of the plurality of indoor units.

In order to solve the above-described problems, according to some implementations of the present disclosure, cooling or heating efficiency of an air conditioner may be improved according to information regarding a location of occupant and/or the number of occupants. The air conditioner may identify an activity area in a space and operate accordingly. In some implementations, machine-learning-based techniques may be implemented for controlling a subsequent operation of an air conditioner based on parameters calculated in an intensive operation section.

As such, some implementations of the present disclosure enable calculating an optimum operation mode of an air conditioner by using parameters calculated by indoor units of a plurality of air conditioners as machine-learning factors.

An operation of a subsequent step may be controlled based on parameters occurring in process of changing temperatures at high-speed during an initial operation of an indoor unit.

The objects of the present disclosure are not limited to the above-mentioned objects, and the other objects and the advantages of the present disclosure which are not mentioned can be understood by the following description, and more clearly understood by the present disclosure. It will be also readily seen that the objects and the advantages of the present disclosure may be realized by means defined by the appended claims.

An air conditioner according to some implementations of the present disclosure may classify different air blowing areas of the air conditioner, for example into an intensive air blowing area and a non-intensive air blowing area. The intensive air blowing area may be determined based on a sensed distance and direction relative to an occupant in an air blowing area of the air conditioner. The other area or areas may be determined as the non-intensive air blowing area.

The air conditioner may operate in an intensive operation mode with respect to the intensive air blowing area, and the air conditioner may operate in an operation mode different from the intensive operation mode with respect to the intensive air blowing area and the non-intensive air blowing area when an operation performed in the intensive operation mode is completed.

In some implementations, the intensive operation mode may include intensively operating the air conditioner so that an indoor temperature quickly reaches a target temperature. The non-intensive operation mode may include operating the air conditioner so that a temperature is maintained or a temperature gradually reaches a target temperature. In some scenarios, comparing the intensive and non-intensive operation modes, the intensive operation mode may consume more power (e.g., electric energy per unit time) than the non-intensive operation mode. In some scenarios, a time required for the air conditioner in the intensive operation mode is shorter than a time required in the non-intensive operation mode.

A cloud server according to some implementations of the present disclosure may include an area recognition unit configured to classify air blowing areas of an air conditioner into an intensive air blowing area and a non-intensive air blowing area by determining the intensive air blowing area based on information on a distance and direction of an occupant received by the air conditioner and determining the other area or areas as the non-intensive air blowing area.

The cloud server may include an operation mode instruction unit configured to instruct the air conditioner to operate, after the air conditioner operates in an intensive operation mode with respect to the intensive air blowing area classified by the area recognition unit, in a non-intensive operation mode distinguished from the intensive operation mode with respect to the intensive air blowing area and the non-intensive air blowing area.

The air conditioner may perform cooling or heating with respect to a space mainly occupied by a user as a result of determining an activity area, and may operate in an operation mode varying according to the space.

Further, some implementations of the present disclosure may acquire information of the activity area to be changed based on information on a location of an occupant which is continuously updated by checking characteristics of a space where the air conditioner is installed and to apply the information to the operation of the air conditioner.

Further, some implementations of the present disclosure may calculate a subsequent operation mode by using a parameter calculated in process that the air conditioner operates in a main living space as a machine-learning factor.

The cloud server may calculate an operation mode suitable for each air conditioner after machine-learning based on parameters calculated and provided in process that a plurality of air conditioners operate.

The air conditioner may operate to reach a predetermined target reaching temperature, and then may maintain the target reaching temperature in a predetermined range based on an amount power consumed per smaller unit time.

Further, some implementations of the present disclosure may classify an air blowing area according to a machine-learning basis to efficiently control cooling or heating of the air conditioner, and may estimate a load according to an operation mode.

Effects of the present disclosure are not limited the aforementioned effects. Those skilled in the art can easily derive various effects of the present disclosure from a configuration of the present disclosure.

Hereinafter, implementations of the present disclosure will be described in detailed with reference to the accompanying drawings so that those skilled in the art can easily carry out the present disclosure.

In order to clearly describe the implementations, the description irrelevant to the implementations has been omitted. Same or like reference numerals designate same or like components throughout the specification. Further, some implementations will be described in detail with reference to the illustrative drawings. Regarding the reference numerals assigned to the components in the drawings, it should be noted that the same components will be designated by the same reference numerals, wherever possible, even though they are shown in different drawings. Furthermore, in relation to describing the present disclosure, the detailed description of well-known related configurations or functions can be omitted when it is deemed that such description may cause ambiguous interpretation of the present disclosure.

Also, in relation to describing components of the present disclosure, terms such as first, second, A, B, (a), (b) or the like may be used. Each of these terms is not used to define an essence, order, sequence or the number of a relevant component but used merely to distinguish the relevant component from other component(s). It should be noted that, when it is described in the specification that one component is "connected," "coupled" or "joined" to another component, the former may be directly "connected," "coupled," and "joined" to the latter or "connected", "coupled", and "joined" to the latter via another component.

In addition, in relation to implementing the present disclosure, features of the present disclosure may be described as being performed by separate components for ease of explanation. However, these features may be implemented by a single device or module, or one feature may be implemented by several devices or modules.

In this specification, components of the air conditioner are classified into an outdoor unit and an indoor unit. One air conditioning system is composed of one or more outdoor units and one or more indoor units. A relationship between the outdoor unit and the indoor unit may be 1:1, 1:N, or M:1.

The present disclosure may be applied to all devices that control cooling or heating. However, for convenience of explanation, the explanation will be focused on cooling. When applied to heating, the implementations of the present disclosure may be applied to a process for increasing a temperature and a mechanism for maintaining the increased temperature.

In the present disclosure, the implementations according to the present disclosure will be described mainly with respect to cooling, but may be applied to heating in the same or similar way.

Figure 2:
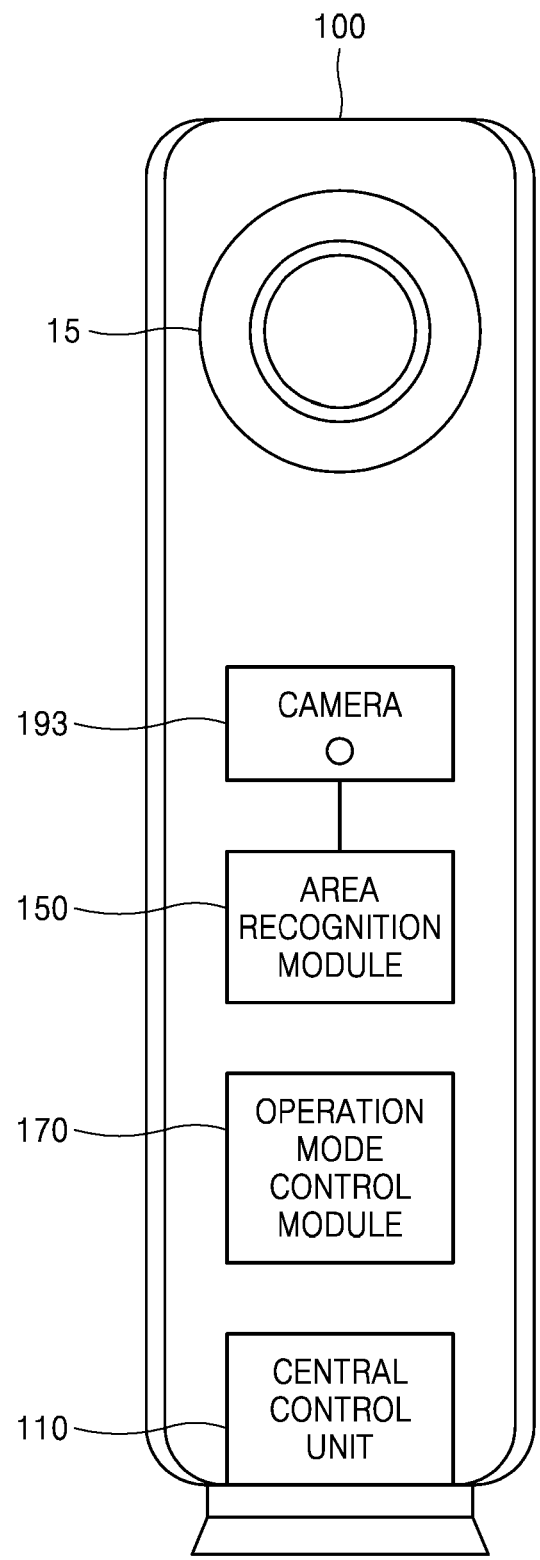
FIG. 2 shows an example of an air conditioner according to the present disclosure.
Figure 3:
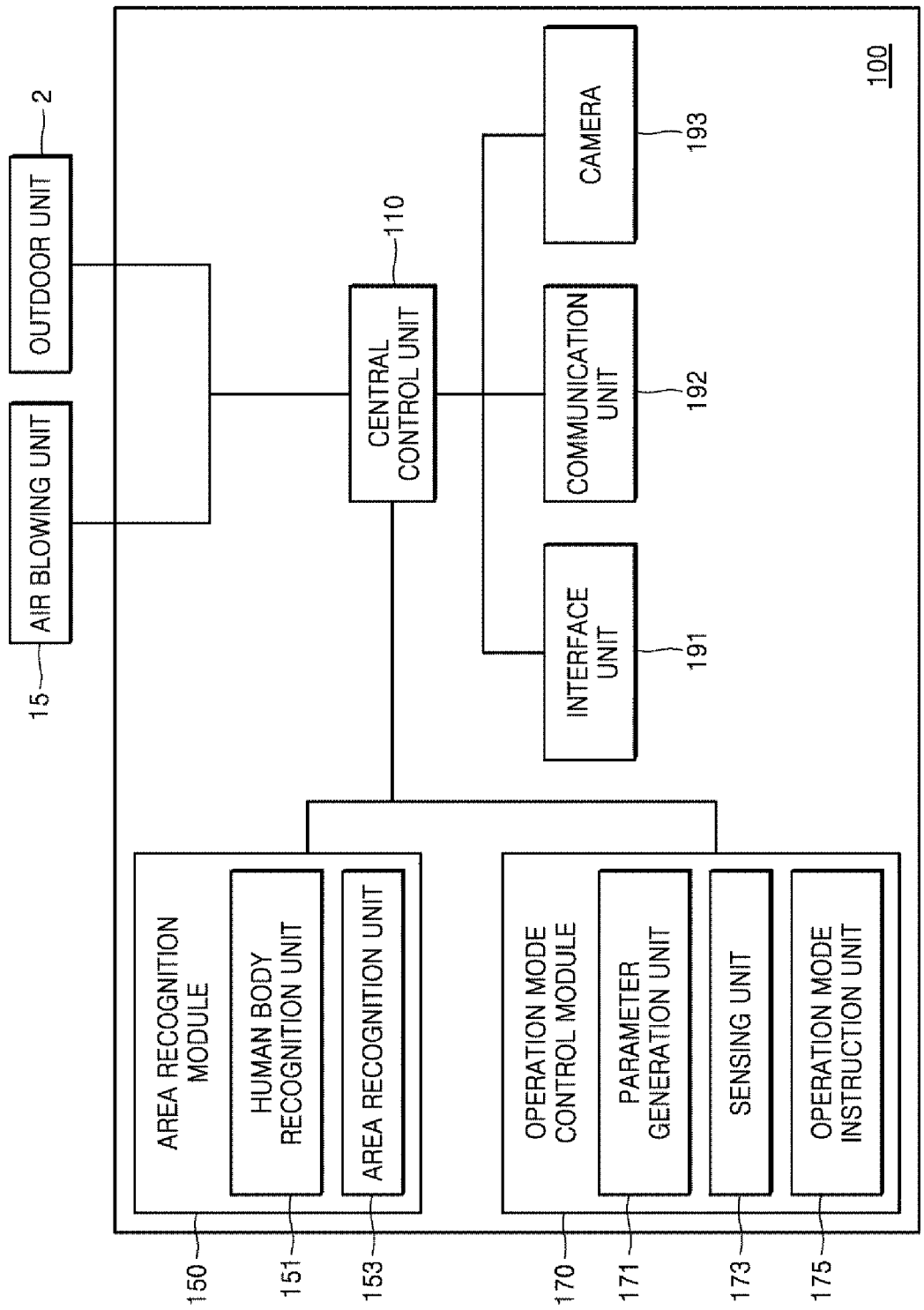
FIG. 3 is a block diagram showing an example of a control relationship between main components of an air conditioner according to the present disclosure.

FIG. 2 is a diagram of an example of an air conditioner according to the present disclosure, and FIG. 3 is a block diagram showing an example of a control relationship between main components of an air conditioner according to the present disclosure.

An air conditioner 100 is exemplified as a stand type air conditioner. However, the present disclosure is not limited thereto, and an air conditioner such as a wall-mounted type air conditioner or a ceiling type air conditioner may also be applied as the air conditioner 100 of the present disclosure, in addition to the stand type air conditioner. An air blowing area is where the wind of the area conditioner 100 reaches. An air blowing area is where the air conditioner 100 supplies air. The air blowing area is defined as the left and right ranges. And the air blowing area is defined as the range of the distance around the air conditioner.

Referring to FIGS. 2 and 3, the air conditioner 100 according to the present disclosure may include at least one camera 193 configured to acquire an external image. In addition, the air conditioner 100 may identify the position where an occupant is located in an indoor space in an image acquired by the at least one camera 193, and may input a result of recognizing a location of the occupant into a machine-learning network (e.g., an artificial neural network) that is pre-learned through machine learning. In some implementations, the air conditioner 100 may include an area recognition module 150 configured to classify an air blowing area into an intensive air blowing area in which air is intensively blown, or a non-intensive air blowing area by inputting data into the above-described artificial neural network. The air conditioner 100 may include an operation mode control module 170 configured to select and control an operation mode suitable for the indoor space, and a central control unit 110 configured to control airflow and an operation of the indoor unit based on the classified air blowing area and operation mode. In some scenarios, one or more processors and computer memories may implement the various units described above, for example, by performing operations of the area recognition module 150, operation mode control module 170, and/or the central control unit 110.

Referring to FIG. 2, the indoor unit of the air conditioner may be provided with a suction port (not shown) configured to suck indoor air and an air blowing unit configured to discharge the air sucked through the suction port back to the indoor space.

The air blowing unit 15 may be provided with a wind direction adjusting unit configured to adjust a wind direction of the discharged air, and may switch an angle and direction of the wind direction adjusting unit by driving a motor and the like according to control of the central control unit 110. Accordingly, the wind direction of the air discharged through air blowing unit 15 may be adjusted.

The wind direction adjusting unit may adjust an air blowing direction, air blowing range and the like of the airflow by controlling an operation performed in a vertical, lateral or specific direction.

With respect to an area recognized and calculated by the area recognition module 150, the wind direction adjusting unit may blow air to perform cooling or heating according to an operation mode calculated by the operation mode control module 170. For example, it is possible to control a direction and angle of the wind discharged from the air blowing unit 15 with respect to the intensive air blowing area, or a wind volume, a wind speed, etc.

The air conditioner may include a fan configured to control a flow of indoor air which is sucked into the suction portion and discharged to the indoor space through the air blowing unit 15. Rotations of the fan may be adjusted by a fan motor, and an operation of the fan motor may be controlled by the central control unit 110.

Accordingly, the central control unit 110 may control a direction of a flow of air (airflow) discharged from the air conditioner 100 with respect to an area recognized and calculated by the area recognition module 150 by controlling the wind direction adjusting unit and fan motor. In addition, the central control unit 110 may control an amount and speed of the airflow by controlling a speed of the fan motor according to an operation mode calculated by the operation mode control module 170.

In particular, the central control unit 110 may control the direction and speed of the airflow so that a cooling (or heating) operation is quickly performed according to an operation mode calculated by the operation mode control module 170 with respect to an area recognized and calculated by the area recognition module 150, for example, an area where a specific object is located. In one example, the central control unit 110 may adjust a cooling speed according to the classified air blowing area (intensive air blowing area or non-intensive air blowing area).

For example, when the central control unit 110 identifies a main activity area in which a plurality of occupants are located or an occupant is located for a long time in the indoor space provided with the air conditioner, the central control unit 110 may set the main activity area as an intensive air blowing area, and may control the airflow so as to further increase an intensity of cooling or heating.

In addition, the central control unit 110 may control the air conditioner to perform a intensive cooling according to an operation mode calculated by the operation mode control module 170 with respect to the intensive air blowing area.

Therefore, the air conditioner according to the present disclosure may perform an intensive air blowing area classification (recognition) based on machine learning with respect to a plurality of air blowing areas in the indoor space, and may also perform a human body detection-based occupant location (distance and direction) recognition based on the machine learning. The control unit 110 may control a direction, intensity, amount, etc. of the wind discharged from the air blowing unit 15 in cooperation with the area recognition module 150.

Referring to the area recognition module 150 in detail, an image acquired (input or captured) through the camera 193 at a predetermined cycle, a predetermined time point or a time point when the number of occupants changes may be used as input data of the artificial neural network pre-learned through the machine learning. In addition, the area recognition module 150 may identify an occupant included in the image, and a location, distance and angle relative to the occupant. A human body recognition unit 151 may search for the location, angle and distance relative to the occupant.

Further, the area recognition unit 153 may accumulate information on a location of the occupant, and may classify an activity area by using a machine learning algorithm that is learned, thereby estimating an area where an actual user mainly resides.

In addition, the area recognition module 150 may use the image acquired through the camera 193 as input data of the artificial neural network pre-learned by the machine learning. The area recognition module 150 may divide the indoor space into a plurality of areas and may classify the plurality of areas into two or more divided areas, for example, a main activity area (intensive air blowing area) and a non-activity area (non-intensive air blowing area). The activity area is an area where the residents mainly work or stay. The activity area is an area estimated to be occupied by residents. As a result, it is possible to estimate an area where the actual occupant mainly resides (intensive air blowing area) and a distance between the area and the air conditioner. Alternatively, the activity area may be sub-classified into a residing area (first intensive air blowing area) and a moving area (second intensive air blowing area). Conversely, the non-activity area may be sub-classified into a moving area (first non-intensive air blowing area) and a non-moving area (second non-intensive air blowing area).

The aforementioned classifications may be calculated by means of information on an area where the occupant is sensed, distance relative to the occupant and frequency at which the occupant are sensed, or a cumulative result of such information. As a result, the air blowing unit 15 may intensively blow air with respect to a place where a person is present or a person is likely to be present, thereby improving cooling or heating efficiency.

When the area recognition module 150 provides the classified air blowing area to the central control unit 110, the central control unit 110 may generate a control signal so that air is blown with respect to the classified air blowing area. More specifically, it is possible to control the fan motor and the wind direction adjusting unit that form the air blowing unit 15 based on the classified blowing area. That is, by using a result of estimating the air blowing area, the airflow may be controlled to be restricted to a space where the actual user mainly resides, and thus the airflow may be restricted with respect to an unnecessary area such as a wall surface. Also, it is possible to perform an operation in a user-customized manner, thereby providing convenience and comfortable to the user, together with an increase in the cooling efficiency.

The pre-learned artificial neural network may form the area recognizing unit 153. Alternately, a learning unit disposed in the external cloud server may include the pre-learned artificial neural network. The central control unit 110 may control a direction and intensity of the airflow according to an area classification result of the area recognition module 150. For example, the central control unit 110 may classify the plurality of areas into the intensive air blowing area and the non-intensive air blowing area based on a location of the identified occupant. As a result, the central control unit 110 may control the direction and intensity of the optimized airflow by controlling the fan motor and the wind direction adjusting unit so that an area corresponding to the intensive air blowing area is quickly cooled.

The human body recognition unit 151 and the area recognition unit 153 may perform a recognition process based on data that is pre-learned through the machine learning.

The human body recognition unit 151 may determine whether or not the occupant is present and the location of the occupant based on the human body detection, and the area recognition unit 153 may distinguish the intensive air blowing area with respect to the plurality of areas, thereby distinguishing the activity area in the indoor space. That is, it is possible to classify the plurality of areas into the activity area (residing/moving) area and the non-activity area by using human body detection information. As a result, it is possible to control the airflow so as to efficiently perform cooling with respect to the intensive air blowing area, which is the activity area, thereby improving the cooling efficiency and energy efficiency.

Also, the air conditioner according to the present disclosure may measure a state of the indoor air and operate to reach a set state. However, in order for the indoor unit to efficiently operate in the process of reaching a specific state, it is necessary to reflect various factors before and after the specific state. When the operation of the indoor unit is controlled more precisely through a learning model based on respective factors, an efficient operation may be possible.

For this purpose, the central control unit 110 and the operation mode control module 170 may calculate a suitable operation mode by sensing a state of the indoor space. Also, the air conditioner may operate in the comfortable mode with respect to the entire area (intensive air blowing area and non-intensive air blowing area) or some area after intensively operating in the high-speed mode with respect to a specific area (intensive air blowing area) calculated previously. The comfortable mode is an operation mode with a power saving function for maintaining a comfortable cooling (or heating) by sensing an environment and adjusting a cooling load accordingly.

The operation mode control module 170 may determine the operation mode with respect to the areas previously calculated by the area recognition module 150. One example of the operation mode may include two modes of a high-speed operation mode and a comfortable operation mode. Alternatively, the operation mode may be classified into a high-speed operation mode, a switching operation mode, and a comfortable operation mode.

These operation modes may be classified based on an intensity of wind, a degree of change in temperature during operation, an amount of energy consumed, or the like. In terms of an amount of energy consumed per hour, the high-speed operation mode may be configured to be the largest and the comfortable operation mode may be configured to be the smallest.

Components required for the operation mode control module 170 to select the operation mode will be described below. A parameter generation unit 171 may generate a parameter such as a temperature or humidity measured or sensed by the air conditioner 100, a change rate of the temperature and humidity, or time required for each change. A sensing unit 173 may sense a temperature or humidity of the air blowing area or a change thereof for the parameter generated by the parameter generation unit 171. The sensed value may be provided to the parameter generation unit 171, and the parameter generation unit 171 may accumulate the sensed values in a memory, and then may generate a parameter. Therefore, the parameter generation unit 171 may calculate a parameter based on an environmental factor, product control information, and the like, and may determine the operation mode based on the parameter.

In one example of the parameter calculated by the parameter generation unit 171, any one or more of locations and areas of the non-intensive air blowing area and the intensive air blowing area in the air blowing area, an initial indoor temperature at a start time point of a section in which the air conditioner operates in the intensive operation mode, a target setup temperature of the section, a temperature change rate of a predetermined initial section of the section, a temperature change rate of the section and a time scale between a start time point and an end time point of the section may be generated as a parameter. In particular, the locations and areas of the intensive and non-intensive air blowing areas to be subjected to the intensive/non-intensive operation modes may be applied as a parameter.

Thereafter, the operation mode instruction unit 175 may instruct the air conditioner to operate in the intensive operation mode for N minutes and to operate in the non-intensive operation mode after the N minutes have elapsed, that the N minutes can be counted from the initial turn-on time point of the air conditioner, or from a specific time point (smart-on time point). The smart-on time point means that the air conditioner checks the indoor temperature or humidity without control of the user during operation and operates accordingly.

The operation mode instruction unit 175 may store information on a target state such as a set target temperature or target humidity. The target state may include one or more temperature data or one or more humidity data. Further, the operation mode instruction unit 175 may selectively include two or more temperature data or two or more humidity data. In this case, a value of the target temperature or the target humidity of the currently operating indoor unit may be selected and set according to the control of the central control unit 110.

The operation mode instruction unit 175 of the operation mode control module 170 may control the operation mode to provide a wind speed, temperature, or wind intensity to be adjusted in each mode. For example, when the operation mode control module 170 performs the high-speed operation mode with respect to an area indicated by the area recognition module 150, an operation state (for example, overload, small-load, medium-load, etc.) in the subsequent comfortable operation mode may be determined based on information derived in the process of performing the high-speed operation mode.

The operation mode instruction unit 175 may instruct the operation mode including information on the target state such as the set target temperature or temperature humidity additionally set for the air conditioner 100. The target state may include one or more temperature data or one or more humidity data. In addition, the operation mode instruction unit 175 may selectively include two or more temperature data or two or more humidity data. In this case, a value of the target temperature or the target humidity of the currently operating air conditioner may be selected and set according to the control of the central control unit 110.

The interface unit 191, which allow the user to control the temperature, humidity, wind volume and wind direction of the air conditioner 100, may provide an interface such as a button type or a remote control type, or remote control. Further, the interface unit 191 may receive an interrupt input for changing the wind speed, wind volume or temperature of air discharged from the air blowing unit 15. The interrupt input may be provided to the area recognition unit 153 or the operation mode instruction unit 175 as predetermined information.

The operation mode instruction unit 175 may determine the operation mode based on information on the air blowing areas calculated by the area recognition module 150 and information calculated by the sensing unit 173 and the parameter generation unit 171.

When based on the area recognition module 150, it is possible to grasp a real life of the user based on area recognition in order to enhance the cooling or heating efficiency of the air conditioner and user comfort. In this process, an area where the occupant is present may be identified by using the pre-learned human body recognition unit 151, area recognition unit 153 and camera.

A space may be recognized in such a manner that the wind volume and wind direction are controlled according to a human body detection result of the area recognition module 150, and the operation mode control module 170 may control the air conditioner appropriately for the space so that the air conditioner operates in a required manner in a required area.

Accordingly, the operation mode instruction unit 175 may instruct the air conditioner to operate in the intensive operation mode for a predetermined period of time with respect to the intensive air blowing area determined by the area recognition module 150 on the basis of the turn-on or smart-on time point of the air conditioner, and may instruct the air conditioner to operate in the non-intensive operation mode with respect to the non-intensive air blowing area and the intensive air blowing area when the intensive operation mode is terminated. The smart-on time point is starting time point of automatic operation mode of air-conditioner without user control.

The communication unit 192 of FIG. 3 may update the components included in the air conditioner 100. In one example, it is possible to update a learning algorithm forming the area recognition unit 153 and the operation mode instruction unit 175, or to receive information updating a learning network (for example, a deep learning network) forming the area recognition unit 153 and the operation mode instruction unit 175.

Alternatively, the communication unit 192 may transmit information calculated by the area recognition module 150 or the operation mode control module 170 to an external server in order to use a learning unit disposed in the external server, and may receive a result from the server. That is, the communication unit 192 may provide a function of transmitting and receiving data to and from the external server, and the data received by the communication unit 192 may be applied to update or upgrade other components.

When the learning unit is disposed in the external server, the learning unit may provide the functions of the area recognition unit 153 and the operation mode instruction unit 175 described above.

The following is a summary of the example shown in FIG. 3.

The camera 193 may sense a distance and direction relative to the occupant based on the air conditioner. The area recognition module 150 may classify air blowing areas of the air conditioner into the intensive air blowing area and the non-intensive air blowing area by determining the intensive air blowing area based on the sensed distance and direction relative to the occupant in the air blowing areas of the air conditioner and determining the other areas as the non-intensive air blowing areas. Thereafter, the operation mode control module 170 may instruct the air conditioner to operate in the intensive operation mode with respect to the intensive air blowing area.

The central control unit 110 may control the air conditioner to operate in the intensive operation mode that is instructed with respect to the intensive air blowing area classified by the area recognition module 150. After completion of the operation in the intensive operation mode, the central control unit 110 may control the air conditioner to operate in the operation mode distinguished from the intensive operation mode performed with respect to the intensive air blowing area and the non-intensive air blowing area. Such an instruction of the mode may be calculated by the operation mode control module 170. As a result, the air conditioner 100 may selectively operate with respect to a specific air blowing area.

Figure 4:
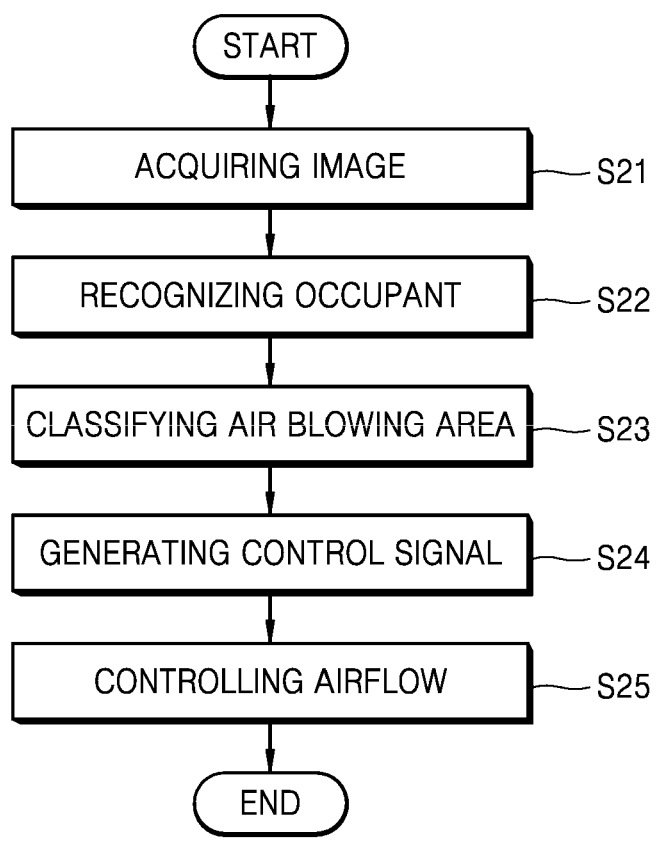
FIG. 4 shows an example of a process in which an area recognition module according to the present disclosure recognizes an area.

FIG. 4 shows an example of a process in which an area recognition module recognizes an area according to the present disclosure. First, an external image of an indoor space having a plurality of areas may be acquired by the camera 193 (S21). The area recognition module 150 may recognize whether or not an occupant is present and a location of the occupant in the image acquired by the camera 193 (S22). For example, the area recognition module 150 may recognize the location of the occupant, more precisely, a distance and direction relative to the occupant based on the data pre-learned through the machine learning (S22).

The area recognition module 150 may classify the plurality of areas as intensive air blowing area and non-intensive air blowing area by using a location recognition result of the occupant as an input to the machine learning network (S23). The intensive air blowing area means an area that the air conditioner sends wind in an intensive operation mode, and the non-intensive air blowing area means an area that the air conditioner sends wind in an non-intensive operation mode. The intensive air blowing area and the non-intensive air blowing area are collectively called as air blowing areas. The central control unit 110 may generate a control signal for controlling the airflow based on the classification of the air blowing areas (S24). For example, in order to rapidly cool/heat or intensively cool/heat the intensive air blowing area recognized as an area where the user actually lives in the indoor space, the central control unit 110 may control the fan motor and wind direction adjusting unit of the air blowing unit 15.

As a result, the airflow may be controlled so that an air blowing direction is focused on a predetermined area (S25). Here, not only a lateral direction of the airflow but also a vertical direction thereof may be controlled because a location of an occupant includes a lateral width as well as information on a distance relative to the occupant.

In some examples, the air conditioner may update the pre-learned data used by the area recognition unit 153 based on the data related to the machine learning that is received from a predetermined server.

Through the steps S21 to S25, the air conditioner may recognize an activity area of occupant in the indoor space where the air conditioner is installed, perform a required operation without an additional device and control by a user, and after this intensive operation, can continuously perform another operation for a comfortable control of the indoor space.

The steps of S21 to S25 may be updated at regular intervals, and as a result, optimum airflow may be controlled in accordance with the changed activity area.

Summarizing the steps S21 to S25, when the image which represents an inner space having a plurality of areas and is captured by the camera 193 is input, the human body recognition unit 151 may perform human body detection. After a predetermined period of time has elapsed, an operation of classifying the plurality of areas as different types of air blowing areas (intensive air blowing area and non-intensive air blowing area) may be performed by using a cumulative number of occupants related to each area, which is obtained as a result of sensing the human body. Based thereon, a control signal for controlling the wind to be blown to the intensive air blowing area may be generated. For this purpose, airflow control such as adjustment of a louver angle and wind volume of the fan motor may be performed. In addition, when the operation is performed in the non-intensive operation mode, for example, the comfortable mode, after the intensive operation mode is performed on the intensive air blowing area based on the control of the operation mode control module 170, the non-intensive operation mode may be set in various ways according to a location of the intensive air blowing area. For example, when the non-intensive operation mode is determined to be an over-load, the operation mode instruction unit 175 may maintain the target temperature and instruct to blow wind of medium strength when the intensive air blowing area is at a medium distance or a long distance. On the other hand, when the intensive air blowing area is at a short distance, the operation mode instruction unit 175 may maintain the target temperature and instruct to blow weak wind. The operation mode control module 170 may change the operation mode according to the location and area of the intensive air blowing area and load steps (over-load, medium-load, small-load, etc.) to be applied to the non-intensive operation mode.

Figure 5:
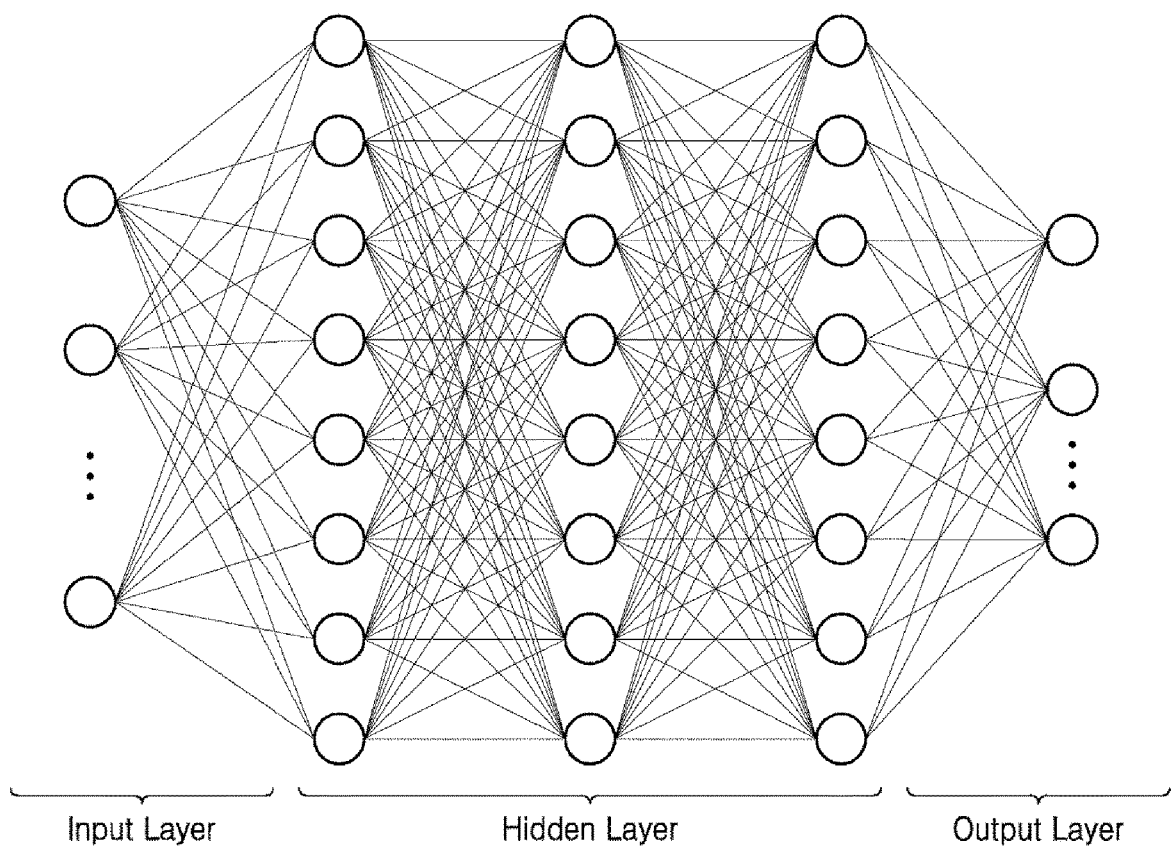
FIGS. 5 to 7 show examples of views related to descriptions of machine-learning (e.g., deep learning) applied in the present disclosure
Figure 6:
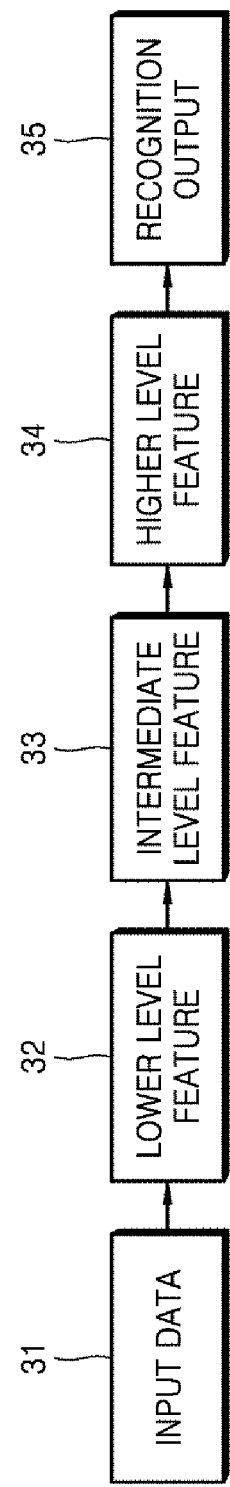
Figure 7:
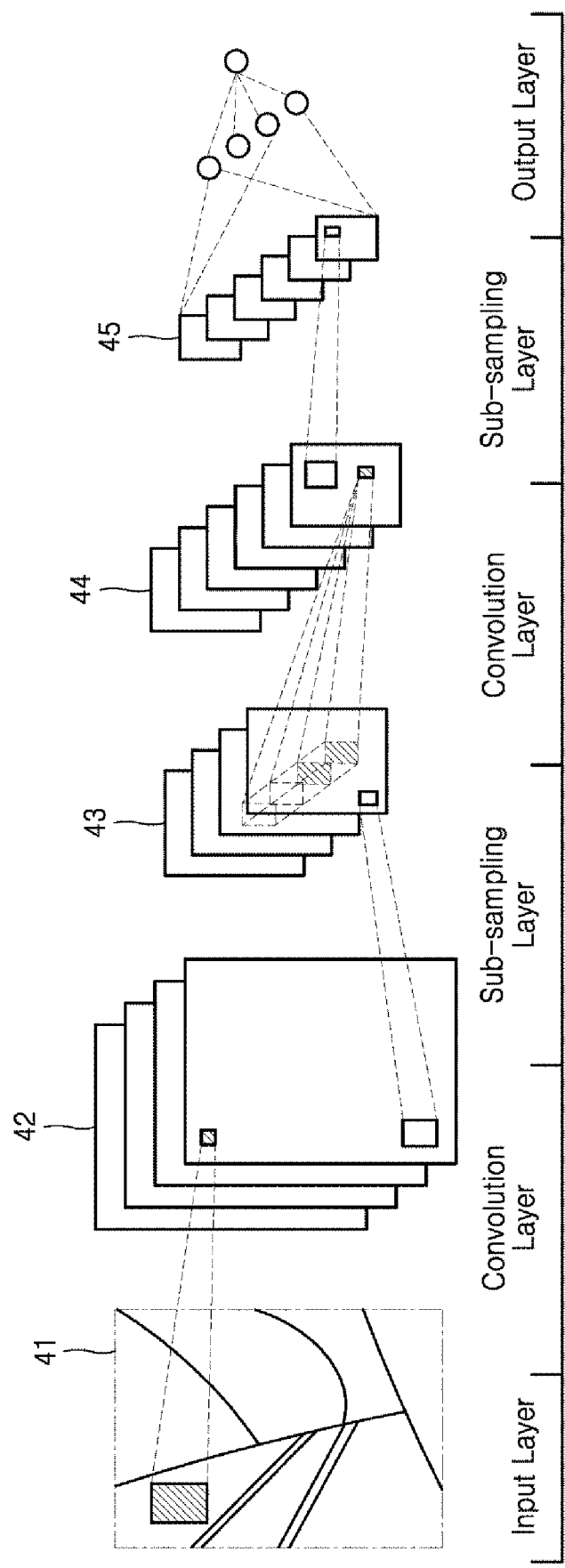

FIGS. 5 to 7 show examples of machine-learning (e.g., deep learning) applied in the present disclosure. The deep learning to be described may form the area recognition unit 153 or the operation mode instruction unit 175 or may form the learning unit disposed in the external server. That is, deep learning, which is a type of the machine learning, may be used to recognize the air blowing area (activity area) or to instruct the operation mode, and a deep learning-based artificial neural network may be applied in this process. The deep learning may refer to data-based learning that reaches a deep level through multiple steps. The deep learning may represent a set of machine learning algorithms that extract key data from multiple data as the level are elevated.

A deep learning structure may include an artificial neural network (ANN). For example, the deep learning structure may be composed of a deep neural network (DNN) such as a convolutional neural network (CNN), a recurrent neural network (RNN), a deep belief network (DBN), and the like.

Referring to FIG. 5, the artificial neural network may include an input layer, a hidden layer, and an output layer. Each layer may include a plurality of nodes, and each layer may be connected to a next layer. The nodes between adjacent layers may be connected to each other with a weight.

For example, the deep learning to be configured in the area recognition unit 153 may divide the air blowing area into a plurality of sub areas, and input whether or not the occupant is sensed or the number of times the occupant is sensed with respect to the divided air blowing areas as a factor to be input to the input layer. As a factor to be output from the output layer, the deep learning may calculate information of the area in detail by determining that a respective sub area is an intensive air blowing area or non-intensive air blowing area, or subdividing the non-intensive air blowing area into a first non-intensive air blowing area and a second non-intensive air blowing area when the respective area is determined to be the non-intensive air blowing area.

Similarly, the deep learning to be configured in the operation mode instruction unit 175 may input information calculated in the process of operating in the intensive operation mode, for example, an initial indoor temperature at a start time point of a section in which the air conditioner operates in the intensive operation mode, a target setup temperature of the intensive operation mode section, a temperature change rate during a predetermined initial period of time of the intensive operation mode section, a temperature change rate of the whole intensive operation mode section and a time scale between a start time point and an end time point of the section, to the input layer.

In addition, a ratio of the intensive air blowing area to the non-intensive air blowing area, and respective sizes, locations, etc. of the intensive air blowing area and the non-intensive air blowing area may also be input to the input layer. The output layer may output information instructing how to operate the non-intensive operation mode that operates after the intensive operation mode is completed. For example, the non-intensive operation mode may be divided into over-load mode, medium-load mode, small-load mode, etc., and instruction information for adjusting a temperature or wind power may be output. The hidden layer may determine the over-load, medium-load and small-load modes by calculating a possibility that chill or heat provided while operating in the intensive operation mode with respect to the intensive air blowing area moves to the surroundings by considering the areas or locations of the intensive air blowing area and non-intensive air blowing area.

Referring to FIG. 6, a computer or machine may discover a predetermined pattern from input data 31 to form a feature map. The computer or machine may extract a lower level feature 32, an intermediate level feature 33 and a higher level feature 34 to recognize an object and output a recognition output as result 35.

The artificial neural network may be abstracted into higher-level features toward layers in next order.

Referring to FIGS. 5 and 6, each node may operate based on an activation model, and an output value corresponding to an input value may be determined according to the activation model.

An output value of an arbitrary node, e.g., the lower level feature 32, may be input to a next layer connected to the corresponding node, e.g., a node of the intermediate level feature 33. A node of the next layer, e.g., a node of the intermediate level feature 33, may receive values output from a plurality of nodes of the lower level feature 32.

At this time, the input value of each node may be a value obtained by applying a weight to the output value of the node of the previous layer. The weight may refer to connection strength between nodes. The deep learning process may be considered as a process of discovering an appropriate weight.

In addition, the deep learning process may be also considered as a process of discovering an appropriate bias. The bias means that values between the nodes are provided to be biased in a specific direction.

An output value of an arbitrary node, e.g., the intermediate level feature 33, may be input to a node of a next layer connected to the corresponding node, e.g., a node of the higher level feature 34. The node of the next layer, e.g., the node of the higher lever feature 34, may receive values output from a plurality of nodes of the intermediate level feature 33.

The artificial neural network may extract feature information corresponding to each level by using a learned layer corresponding to each level. The artificial neural network may sequentially perform abstraction to recognize a predetermined object by utilizing feature information of the highest level.

For example, referring to a face recognition process through deep learning, the computer may distinguish between bright pixels and dark pixels from input images according to brightness of the pixels, distinguish between simple forms such as borders and edges, and distinguish between more complicated forms and an object. The computer may recognize a form that defines a human face.

The deep learning structure according to the present disclosure may use various known structures. For example, the deep learning structure according to the present disclosure may be a convolutional neural network, a recurrent neural network, a deep belief network, and the like.

The recurrent neural network may be widely used for natural language processing, etc., and may be a structure effective for processing time-series data changing over time, which may form an artificial neural network structure by stacking layers at each moment.

The deep belief network is a deep learning structure formed by stacking a restricted boltzman machine (RBM), which is a deep learning technique, in a multiple layered manner. When the restricted boltzman machine learning is repeated to reach a predetermined number of layers, the deep belief network having a corresponding number of layers may be formed.

The convolutional neural network, which is a structure that is commonly used in an object recognition field, will be described with reference to FIG. 7. The convolutional neural network may be a model that simulates a person's brain function based on the assumption that a person recognizes an object by extracting basic features of the object and subsequently performs complicated calculations through the brain.

FIG. 7 shows an example of a structure of the convolutional neural network.

The convolutional neural network may also include an input layer, a hidden layer, and an output layer.

A predetermined image 710 may be input to the input layer.

Referring to FIG. 7, the hidden layer may be composed of a plurality of layers, and may include a convolution layer and a sub-sampling layer.

In the convolutional neural network, various filters for extracting features of an image through convolution operations and pooling or non-linear activation functions for adding non-linear characteristics may be basically used together.

Convolution may be mainly used when performing filter operations in an image processing field, and may be used to implement a filter for extracting features from an image.

For example, when the convolution operation is repeatedly performed on the entire image while moving a window having a predetermined size, an appropriate result may be obtained according to a weight value of the window.

The convolution layer may perform a convolution operation on input image data 41 and 43 by using the convolution filter, and may generate feature maps 42 and 44 in which the features of the input image 41 are expressed.

As a result of convolution filtering, filtering images corresponding to the number of filters may be generated according to the number of filters included in the convolution layer. The convolution layer may include nodes included in the filtered images.

The sub-sampling layer paired with the convolution layer may include the same number of feature maps as that of the convolution layer forming a pair.

The sub-sampling layer may reduce a dimension of the feature maps 42 and 44 through sampling or pooling.

The output layer may recognize the input image 41 by combining various features expressed in the feature map 45.

The area recognition module of the air conditioner according to the present disclosure may use the various deep learning structures as described above. For example, the convolutional neural network structure that is widely used when recognizing an object in an image may be used, although the present disclosure is not limited thereto.

Learning of the artificial neural network may be performed by adjusting a weight of a connection line between nodes so that a desired output is obtained with respect to a given input. The artificial neural network may continuously update a weight value by learning. A method such as back propagation or the like may be used for learning of the artificial neural network.

The area recognition module 150 according to the present disclosure may divide the indoor space into a plurality of areas by using the image acquired by the camera 193 as input data of the artificial neural network pre-learned through the machine learning, and may classify the plurality of air blowing areas into an intensive air blowing area and a non-intensive air blowing area.

Alternately, the area recognition module 150 may classify the air blowing area into a plurality of intensive air blowing areas and a plurality of non-intensive air blowing areas in more detail.

The area recognition module 150 may accumulate the location recognition results of the occupant, and may distinguish the air blowing area with respect to the plurality of areas based on the accumulated location recognition result.

Based on the above-descriptions, according to the present disclosure, it is possible to distinguish between an intensive air blowing area and a non-intensive air blowing area based on location information such as a distance and direction relative to occupants, and to apply an operation mode suitable for each area. In one example, the intensive operation mode may be applied to the intensive air blowing area to enable a high-speed operation (operation of allowing an indoor temperature to quickly reach a target temperature).

The number of rotations of the fan motor forming the air conditioner, an angle of the louver and an angle of the guide may be adjusted. Also, a wind volume may be adjusted so that the wind reaches the intensive air blowing area. In the subsequent non-intensive operation mode, the air conditioner may operate so as to further include the non-intensive air blowing area as target areas based on a comfortable operation (operation for maintaining a current temperature or maintaining the current temperature to be gradually close to a target temperature).

Hereinafter, an example in which the area recognition module classifies air blowing areas into an intensive air blowing area and a non-intensive air blowing area based on a location (distance and direction) of an occupant will be described.

Figure 8:
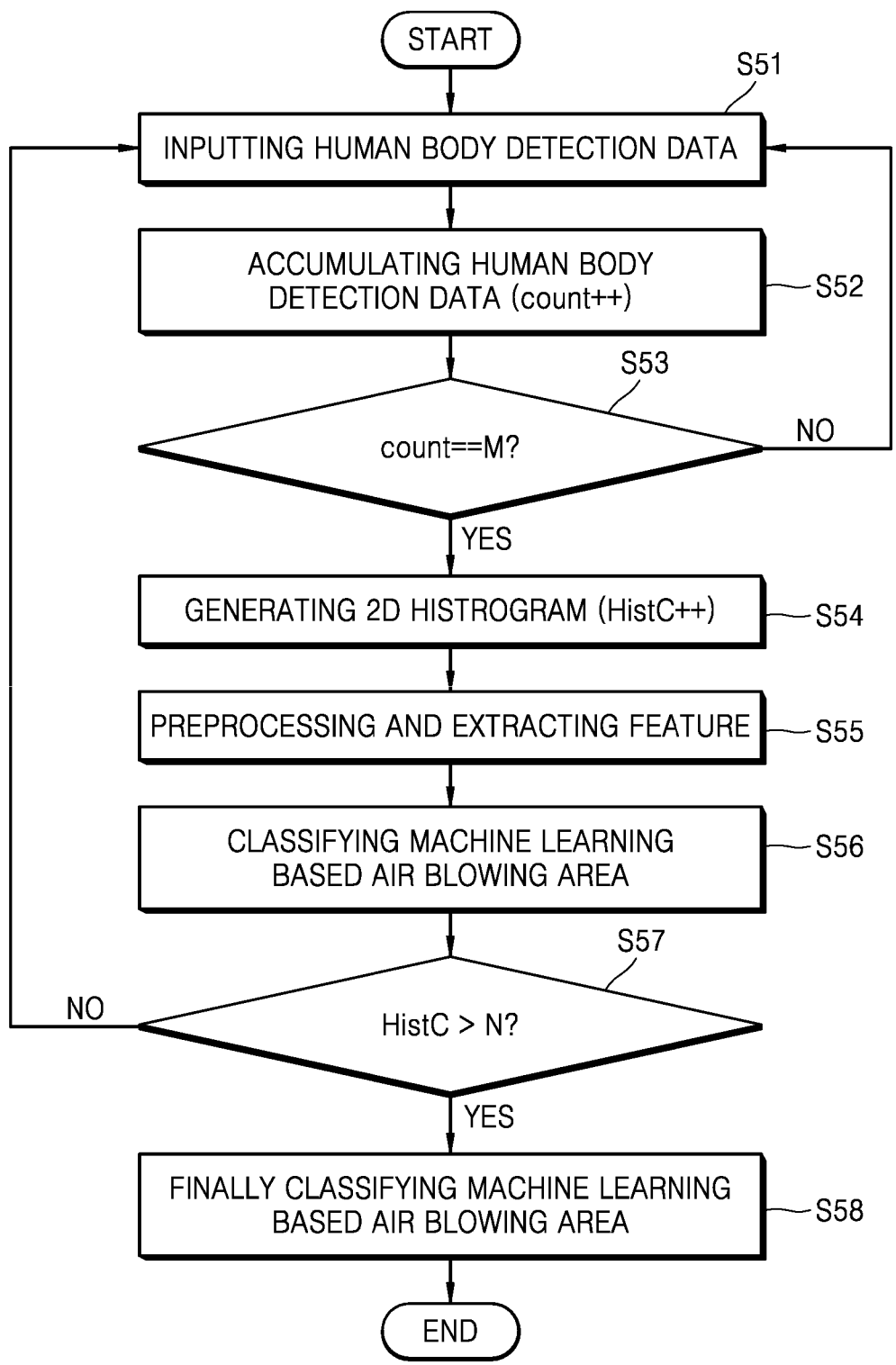
FIG. 8 is a flowchart of an example of a process of recognizing an air blowing area according to the present disclosure.

FIG. 8 is a flowchart showing an example of a process of recognizing an air blowing area according to the present disclosure. FIG. 8 shows a process in which the area recognition module 150 recognizes and classifies an area where a user mainly lives in the indoor space as an intensive air blowing area.

Referring to FIG. 8, the area recognition unit 153 may receive human body detection data including a result of recognizing a location of an occupant from the human body recognition unit 151 (S51), and may accumulate the received human body detection data (S52). Here, the human body detection data may form a reference location of the indoor unit with an angle and a distance. Distance information may be classified by a meter or centimeter in detail, or may be classified into a short distance/a medium distance/a long distance.

The area recognition unit 153 may count a certain type of data within the human body detection data while accumulating the data (S53), and when a predetermined number (M) of the counted data or more is accumulated, the area recognition unit 152 may generate a two-dimensional histogram (S54). The two-dimensional histogram may be formed in two dimensions so as to reflect an angle and distance calculated as a result of sensing the occupant. The generation of the histogram will be described later.

Then, in order to sense an air blowing area based on the two-dimensional histogram, a preprocessing operation may be performed on each data, and a feature thereof may be extracted (S55). The area recognition unit 153 may divide the air blowable space into a plurality of areas based on the machine learning by using the generated histogram as input data (S56).

In one example, the air blowable space may be classified into an intensive air blowing area and a non-intensive air blowing area, or may be further classified into a first intensive air blowing area, a second intensive air blowing area, . . . , a first non-intensive air blowing area, or a second non-intensive air blowing area, for instance. The machine learning may use techniques such as a support vector machine (SVM) and AdaBoost, and more preferably, deep learning technique.

When the results are constantly accumulated (S57), a final classification result of the machine learning with respect to the air blowing area may be derived (S58).

That is, the area recognition unit 153 may include the artificial neural network pre-learned through the machine learning, and may accumulate results of recognizing a distance and direction relative to an occupant, thereby generating a histogram corresponding to the plurality of areas. The area recognition unit 153 may use the generated histogram as input data of the artificial neural network to distinguish between the intensive air blowing area from the non-intensive air blowing area.

In some examples, in order to increase accuracy of the air blowing area classification, the step S55 may be repeated (S57), and on the basis of a result of collecting a plurality of classification results, a plurality of air blowing areas of the indoor space may be classified into one or more intensive air blowing areas and one or more non-intensive air blowing areas (S58).

That is, when the result of the activity area classification is accumulated by more than a predetermined number of times, the final result may be derived, thereby securing reliability of the activity area recognition result and eliminating a temporary error of the non-activity area caused by a human detection error.

Figure 9:
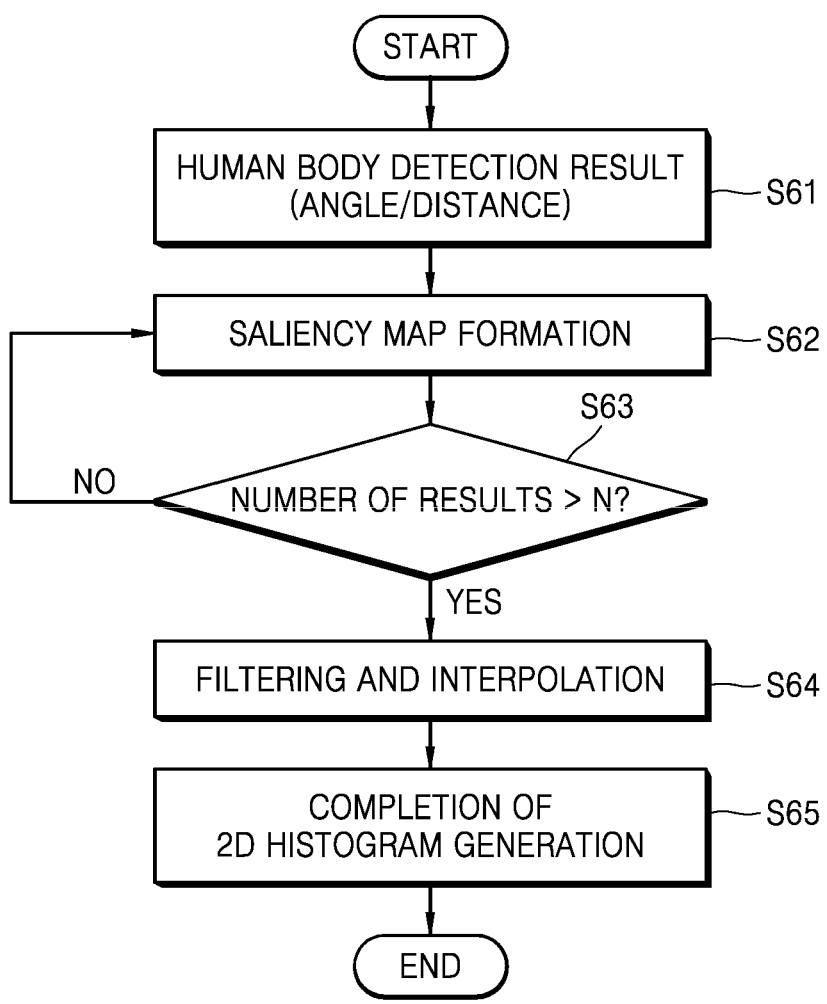
FIG. 9 shows an example of a data preprocessing process required for classifying an area according to the present disclosure.

FIG. 9 is shows an example of a data preprocessing process for classifying an area according to the present disclosure.

The preprocessing operation performed in the step S55 of FIG. 8 may be largely composed of two steps. The preprocessing operation may be performed by the area recognition module 150. When the human body recognition unit 151 inputs a result of sensing a human body (i.e., an angle and distance of the sensed location) to the area recognition unit 153 (S61), the area recognition unit 153 may form a saliency map (S62).

This configuration means that location information (angle and distance) of the human body sensed by the human body recognition unit 151 may be quantized, and then the frequency may be updated. In this process, top, bottom, and left and right areas may be also accumulated in order to express an area well. This process may be repeated until N detection results are input (S63).

When the process is sufficiently repeated so that the detection results are duplicated, filtering and interpolation operations may be performed (S64). A maximum/minimum frequency value filtering and interpolation operations may be performed so as to prevent a detection result biased in a specific angle/distance area, thereby converting the processed data into a continuous two-dimensional histogram.

Figure 14:
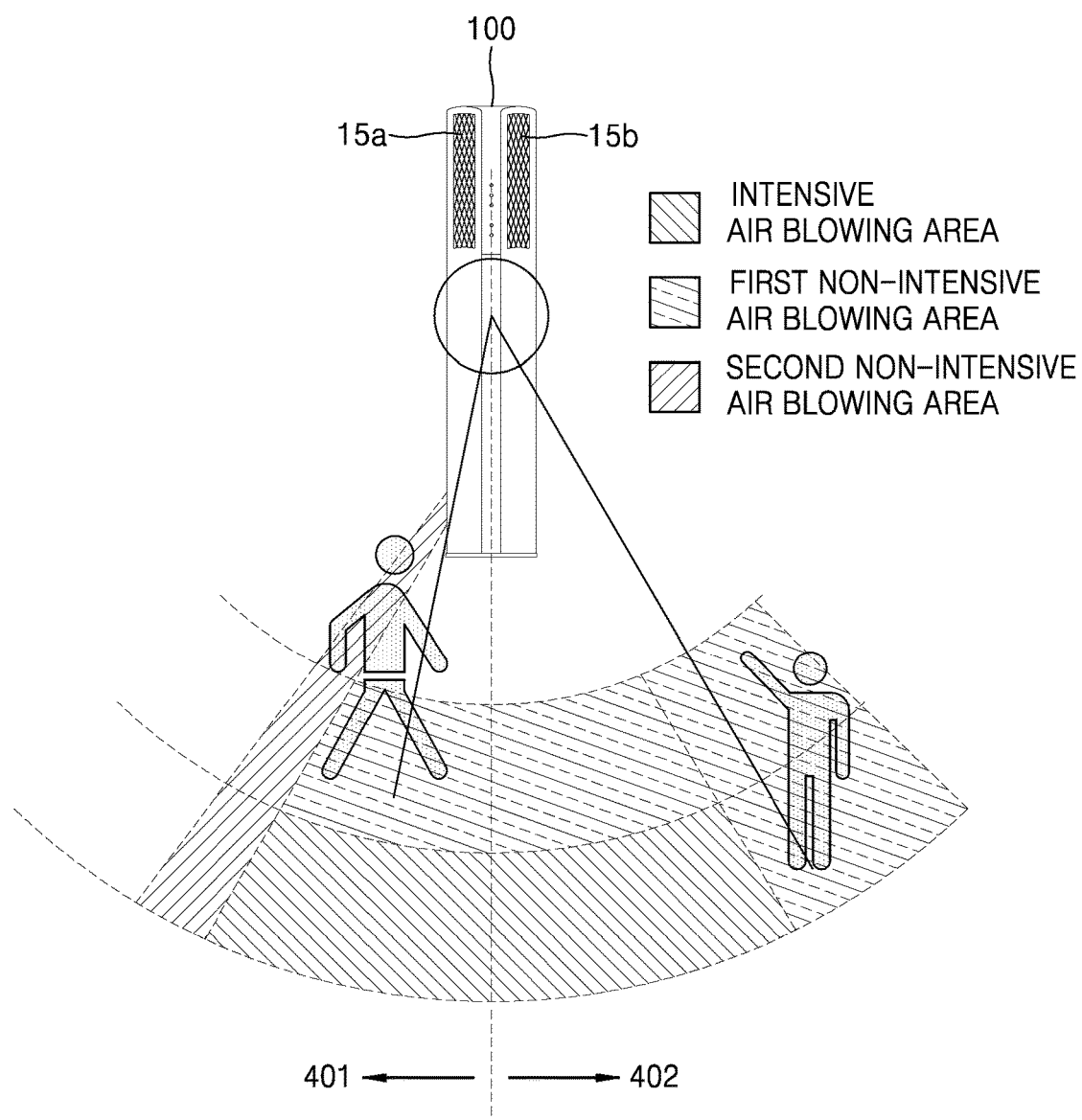
FIG. 14 shows an example of a result of sensing a final space according to the present disclosure.

The following is a summary of FIG. 9. The human body recognition unit 151 may recognize whether or not an occupant is present and a distance and direction relative to the occupant in an image acquired by the camera 193. The area recognition unit 153 may distinguish an activity area with respect to a plurality of areas based on a result of recognizing the occupant. The result of the distinguish process is as shown in FIG. 14.

Figure 10:
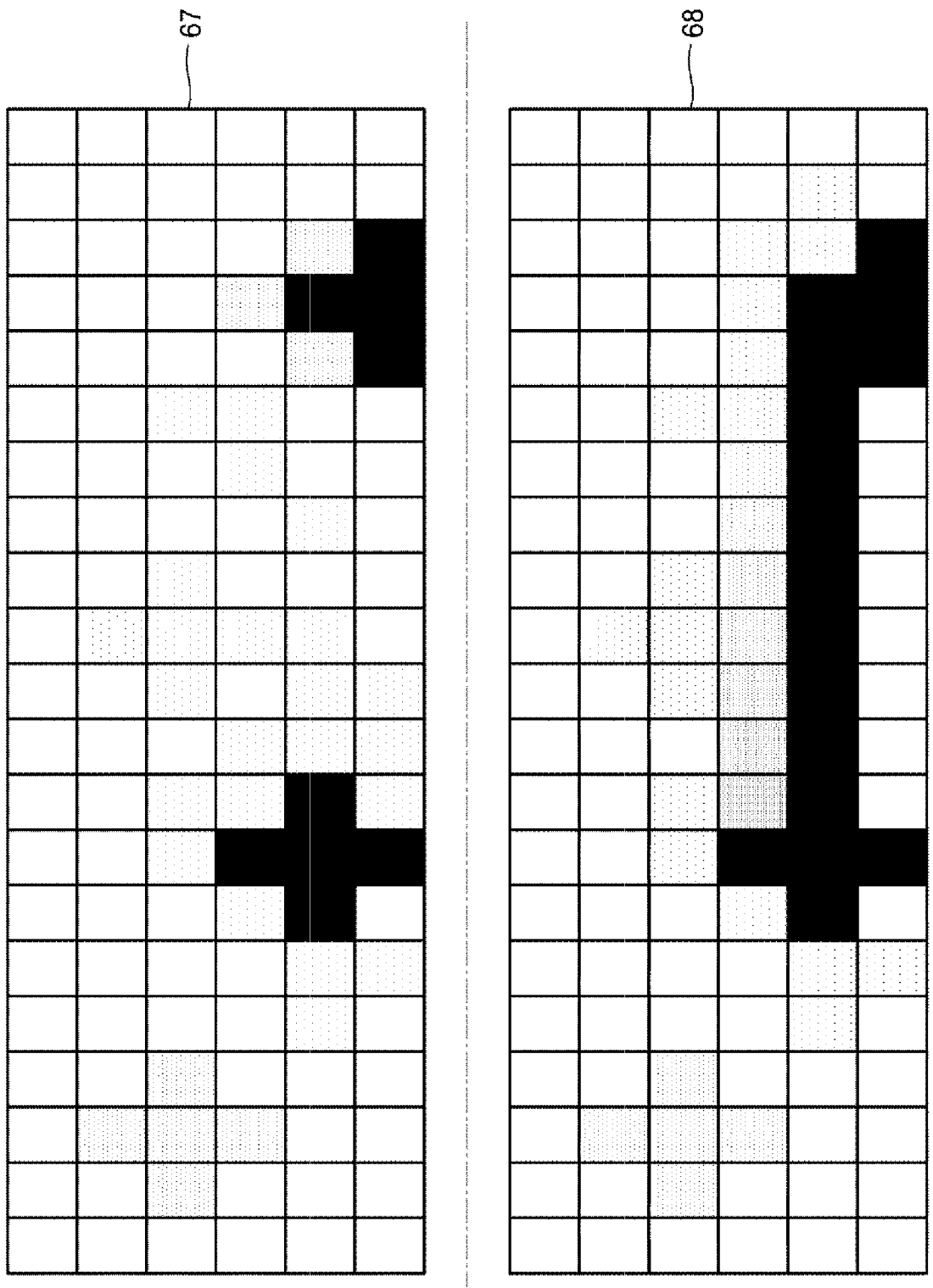
FIG. 10 shows an example of a saliency map and a two-dimensional histogram according to the present disclosure.

FIG. 10 shows an example of a saliency map and a two-dimensional histogram according to the present disclosure. Numeral 67 of FIG. 10 is a configuration in which the saliency map is arranged on an X-axis and a Y-axis to correspond to a distance and angle based on the saliency map. Numeral 68 shows the two-dimensional histogram generated as a result of continuous accumulation of the saliency map.

Figure 11:
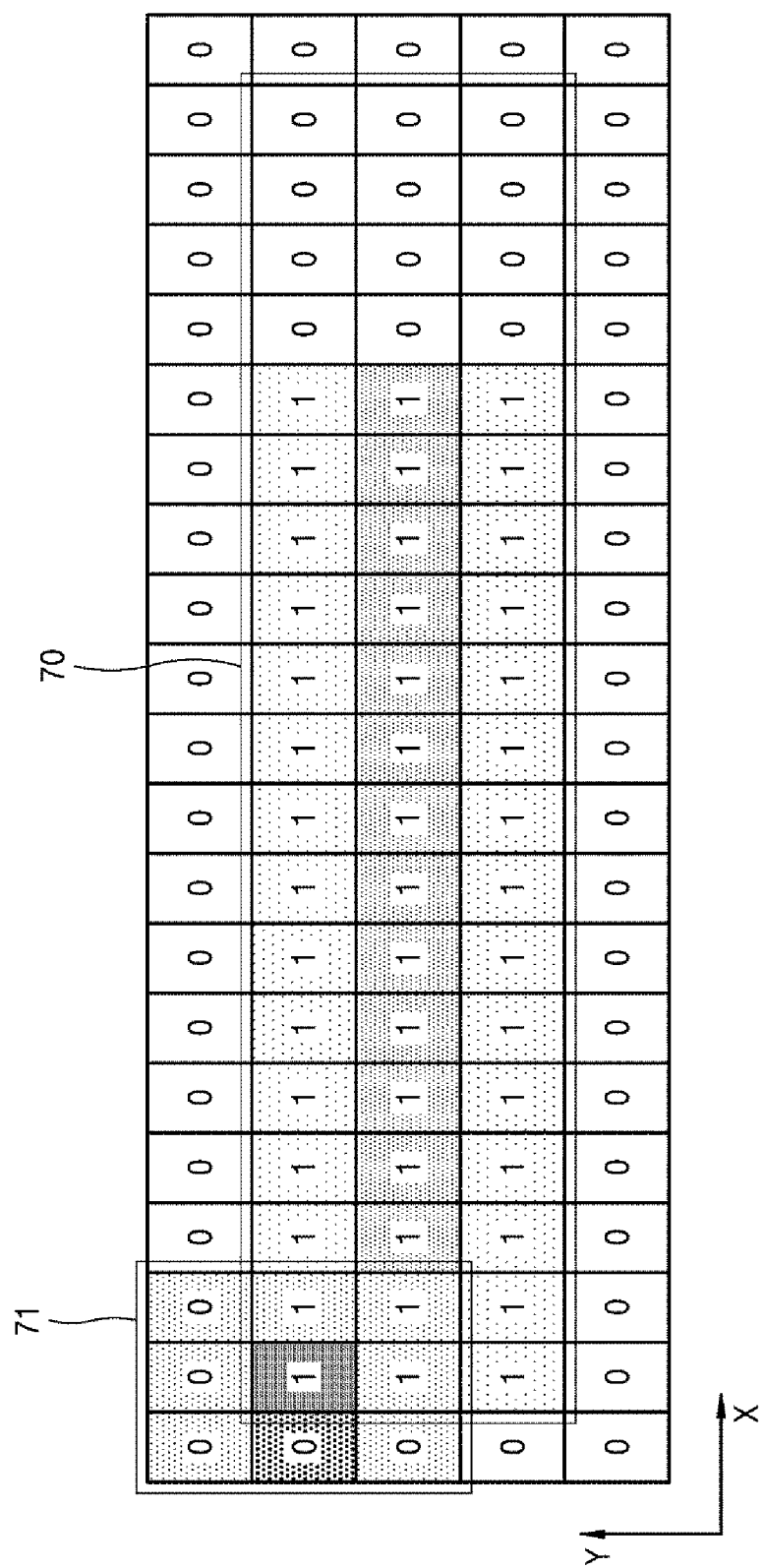
FIG. 11 shows an example of a feature extraction process required for classifying an area according to the present disclosure.

FIG. 11 shows an example of a feature extraction process for classifying an area according to the present disclosure. When a two-dimensional histogram is generated as shown in FIG. 10, features may be extracted as shown in the step S55 of FIG. 8.

A feature vector n may be extracted for each angle in the histogram shown in 68 of FIG. 10. A histogram serial value of an angle to be extracted and a surrounding serial value w may be used as a feature value. When there is no surrounding serial value at left and right ends of the histogram (0 to 5 degrees, 100 to 105 degrees, etc.), a feature may be extracted by setting a corresponding value to 0.

The Y-axis of the histogram of FIG. 11 may be defined according to a distance between the occupant and the air conditioner, and the X-axis may be defined according to an angle at which the occupant is located relative to the air conditioner. The location of the occupant may be indicated by a numeral in a specific cell, and the numeral may increase according to the number of times the occupant is sensed.

When 3×3 cells adjacent to each cell of an air blowing area 70 are input to the input layer shown in FIG. 5 by using a deep neural network 71 having a 3×3 size, a result of determining whether a corresponding area belongs to an intensive air blowing area or non-intensive air blowing area may be calculated through the output layer. This operation may be performed for all cells in the air blowing area 70.

As a result, the entire air blowing area may be classified into the intensive air blowing area and the non-intensive air blowing area depending on whether each cell belongs to the intensive air blowing area or the non-intensive air blowing area. It is has been described above that, in this process, the intensive and non-intensive air blowing areas may be further classified.

Figure 12:
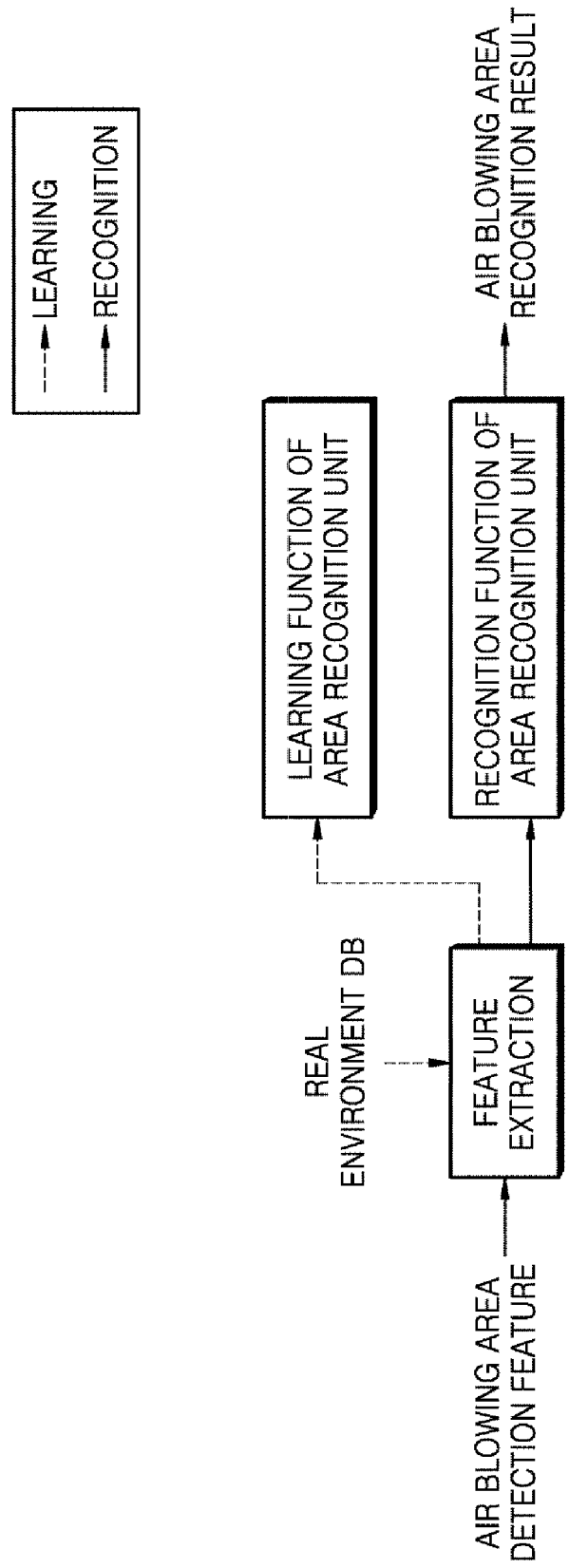
FIG. 12 shows an example of a process of recognizing an air blowing area according to the present disclosure.

FIG. 12 shows an example of a process of recognizing an air blowing area according to the present disclosure. The recognition of the air blowing area may be performed by the area recognition unit 153. Alternatively, the function of the area recognition unit 153 may be provided by the learning unit of the server. The area recognition unit 153 may operate in a process divided into two processes of a learning process and a recognition process.

Referring to FIG. 12, the area recognition unit 153 may have a learning process (indicated by a dotted line) and a recognition process (indicated by a solid line). Once the learning is performed at a predetermined level, only a process of recognizing an area without learning may be performed.

Referring to the learning process, a learning process indicated by a dotted line may be a process of extracting all features of a recognition database for an air blowing area collected before learning, and learning the area recognition unit 153. At this time, an image database may be an image from which it is possible to identify a category to which each specific area belongs.

As shown in FIG. 5, histogram values for the air blowing area (for example, values of the respective cells and the surrounding cells) may be input to the input layer. The output layer outputs intensive air blowing area or non-intensive air blowing area corresponds to the input. The artificial neural network adjusts parameters (weight and bias) of a neural network through neural network learning.

Such learning may be performed for a predetermined period of time when the air conditioner 100 is installed and operated. Even after learning at a set level or higher is performed, whenever a recognition result is derived, updating may be performed by reflecting the result on the existing learned model parameter.

Alternatively, at least some of the images captured by the camera may be transmitted to the external server, and the learned data may be received from the external server to update the artificial neural network.

Thereafter, the area recognition unit 153 may perform a recognition process as indicated by a solid line flow, and may identify the air blowing areas and classify it into an intensive air blowing area and a non-intensive air blowing area based on an image acquired and newly input by the camera 193 (i.e., solid line flow).

When learning is performed as shown in FIG. 12, a weight and a bias activation function forming the deep neural network as shown in FIG. 5 may be determined. The weight and bias activation functions may be sets of complicated connections between nodes of adjacent layers, and the weights and biases may be calculated to satisfy the input and output layers in the learning process. Through repeated learning, optimum weights and biases may be calculated.

When a group of cells in the histogram (for example, 3×3 cells including a specific cell and surrounding cells of the specific cell) is input as an input value in order to recognize an area with respect to the deep neural network generated in a way described above, an output terminal may calculate an area recognition result for the specific cell (an intensive air blowing area or a non-intensive air blowing area). Alternatively, it is possible to calculate three or more air blowing areas and determine them as one of a first intensive air blowing area, a second intensive air blowing area and a non-intensive air blowing area, or as an intensive air blowing area, a first non-intensive air blowing area and a second non-intensive air blowing area. The air blowing area may be also classified into an intensive air blowing area, an intermittent air blowing area and a non-air blowing area.

The operation mode control module 170 may operate the air conditioner in the intensive operation mode with respect to the intensive air blowing area, and then may operate the air conditioner in the non-intensive operation mode with respect to the other areas.

Figure 13:
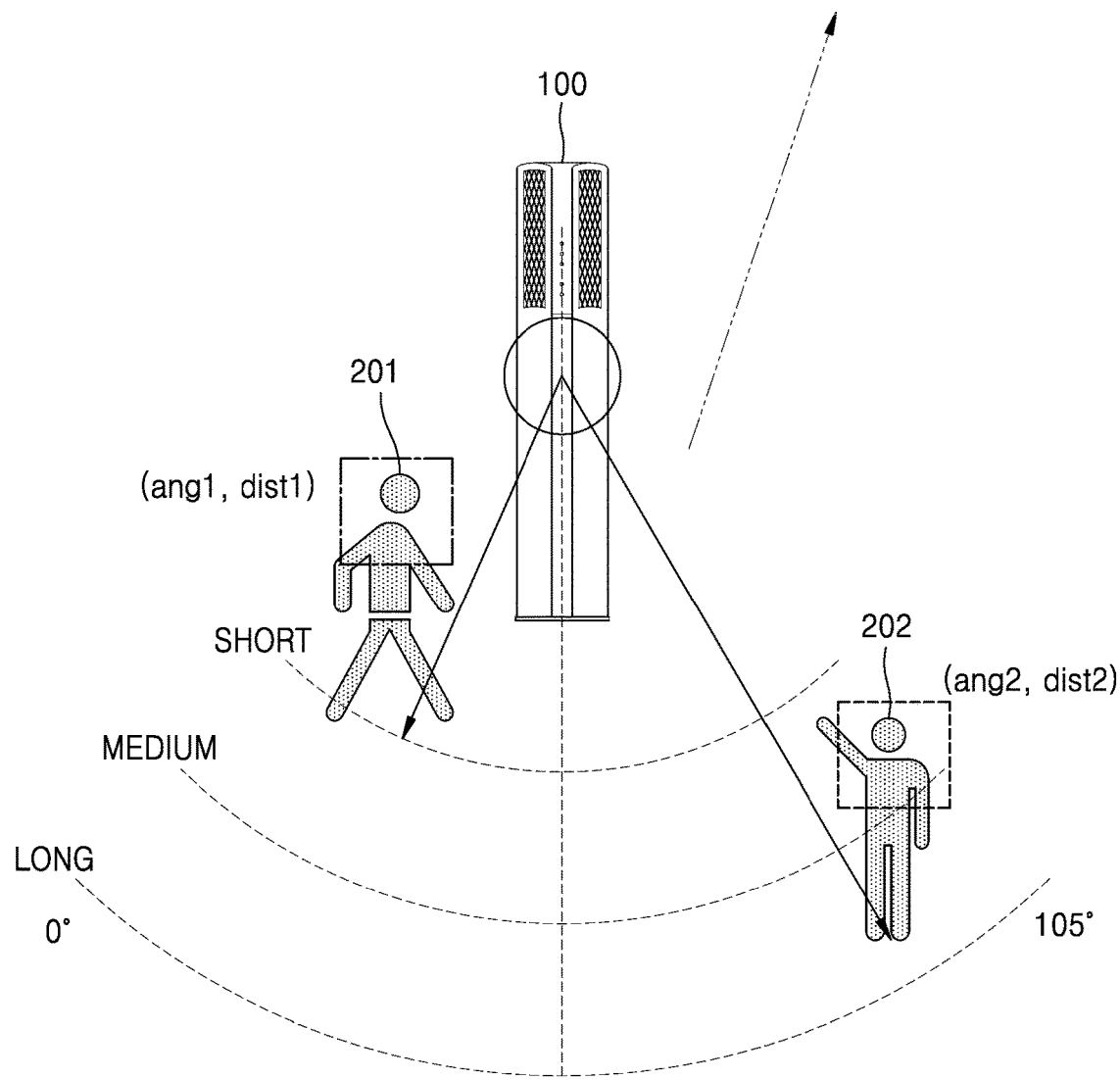
FIG. 13 shows an example of an air conditioner according to the present disclosure which captures an indoor space through a camera to acquire an image, and identifies presence of an occupant and a location of the occupant in the acquired image.

FIG. 13 shows an example of an air conditioner according to the present disclosure which captures an indoor space through a camera to acquire an image, and recognizes whether or not occupants 201 and 202 are present, and also locations of the occupants in the acquired image.

At this time, location information of the recognized occupants 201 and 202 may include angle information ang1 and ang2 and distance information dist1 and dist2. The angle and distance may be divided into predetermined ranges. For example, in case the x-axis directional span of the histogram in FIG. 5 corresponds to the total angle of 105 degrees, the span of single cell corresponds to 5 degrees. Likewise, with respect to the distance, the cells in the histogram may be divided into three levels in the y-axis direction, such as short, medium and long cells.

The simplified histogram 205 in FIG. 13 shows detection frequency by distance and angle implemented as a matrix type histogram having a plurality of rows and columns. The histogram 205 may be generated by accumulating occupant recognition results. Based on whether the occupant recognition results are equal to or more than a predetermined period of time or a predetermined number of times, the area recognition unit 153 may perform classification of the air blowing areas.

In some examples, it is possible to reflect a weight on a specific recognition result without reflecting a one-time recognition result at the same level. For example, a higher weight may be assigned to a location in which an occupant is continuously recognized or a location with high recognition frequency within a predetermined period. When results of classification of the air blowing area are accumulated more than a predetermined number of times in order to improve accuracy, it is possible to finally distinguish between the intensive air blowing area and the non-intensive air blowing area by analyzing with a deep learning based algorithm. By applying the deep learning algorithm, it is possible to perform such classification with high robustness and reliability.

A cell at a lower left end in the two-dimensional histogram 205 (at a long distance of 0 degrees) may sense the occupant 202, and therefore may become +1. Likewise, a cell at an upper right end in the two-dimensional histogram 205 (at a short distance of 105 degrees) may become +1 because it also senses the occupant 201. A value of each cell in the histogram may be changed according to a detection situation of occupants, and when a predetermined level is reached, a detection result may be input to the area recognition unit 153 as shown in FIGS. 11 and 12, and accordingly it is possible to distinguish between the intensive air blowing area and non-intensive air blowing area for each cell.

The above-description is based on a configuration in which a 3×3 cell group is input. However, it is also possible to input a 5×5 cell group according to an implementation method. In this case, with respect to a specific cell in the diagram, additional two cells in horizontal, vertical and diagonal directions from that specific cell may be added to the input data. And the specific cell is added to the boundary of the 3×3 cell with value "0" for indicating outer space of the blowing area.

FIG. 14 shows an example of a result of sensing a final space according to the present disclosure. FIG. 14 is an example in which the individual air blowing area is classified into the intensive air blowing area, first non-intensive air blowing area, or second non-intensive air blowing area. The air conditioner 100 may operate in the intensive operation mode with respect to a space determined by the area recognition unit 153 as the intensive air blowing area.

After operating in the intensive operation mode for a predetermined period, the air conditioner 100 may operate in the non-intensive operation mode with respect to the first non-intensive air blowing area and the intensive air blowing area. In one example, the intensive operation mode performed in this process means a mode of allowing a temperature to quickly reach a target temperature, and the non-intensive operation mode is a mode of controlling an operation of the air conditioner 100 according to an instruction of the operation mode control module 170 after an operation performed in the intensive operation mode is completed.

According to the above-described examples, the air conditioner 100 may restrict airflow only to a space where the user mainly resides and control the airflow by using a result of estimating the intensive air blowing area, that is, an activity area as a residing area and a non-residing area.

As a result, it is possible to restrict the airflow toward an unnecessary area such as a wall surface, etc. and to perform a user-customized operation, thereby increasing cooling and heating efficiency and providing convenience and comfort to the user. In addition, it possible to intelligently select the operation mode into the intensive operation mode and the non-intensive operation mode depending on location and movement of an occupant or occupants, and thus the user may allow a temperature of a main air blowing space (intensive air blowing area) to reach a target temperature in a short period of time.

Further, it is possible to constantly update an algorithm independent of an installation environment of an air-conditioner to acquire information on new or changed areas where occupants are present and active, and adapt the operation of the air-conditioner to the new changed areas. Classifying the air blowing areas may be also performed continuously to update data of a location of an occupant within the space.

The communication unit 192 may continuously update the deep learning forming the area recognition unit 153 or the operation mode instruction unit 175 by receiving data required for software upgrade from the outside so that the deep learning is updated for a deep learning module having higher accuracy.

Figure 15:
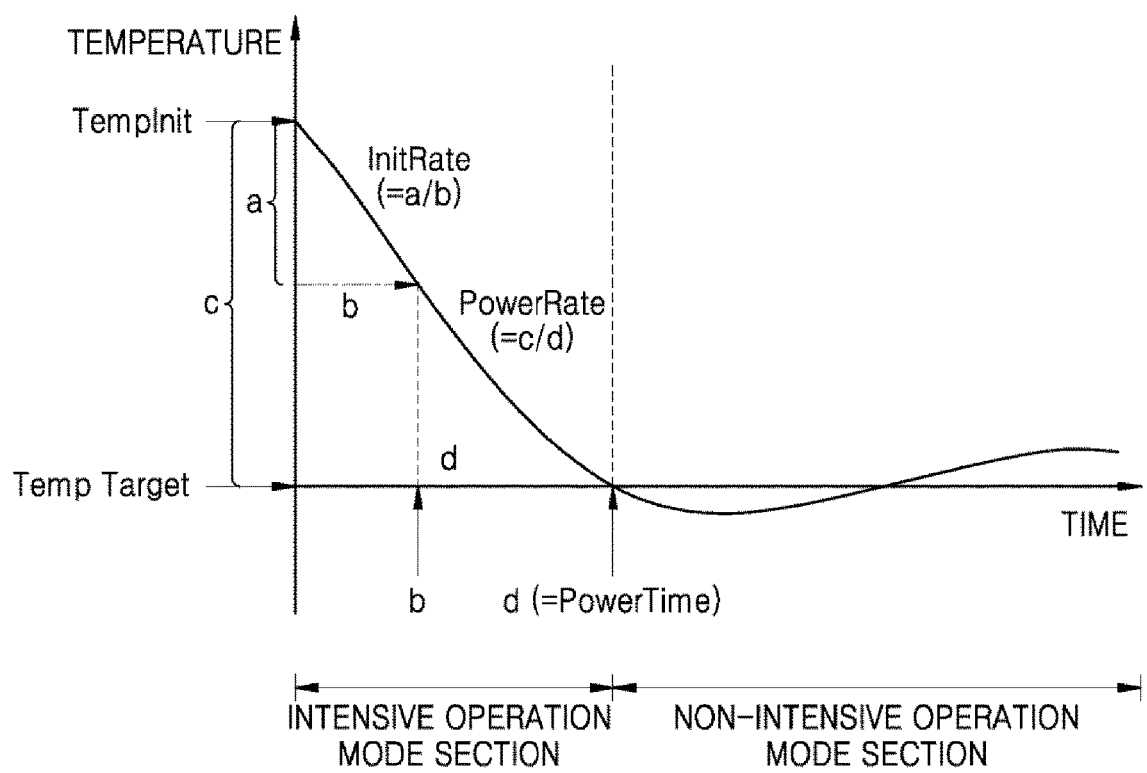
FIGS. 15 to 17 show examples of a configuration in which an operation mode control module according to the present disclosure operates by changing an operation mode from an intensive operation mode to a non-intensive operation mode.
Figure 16:
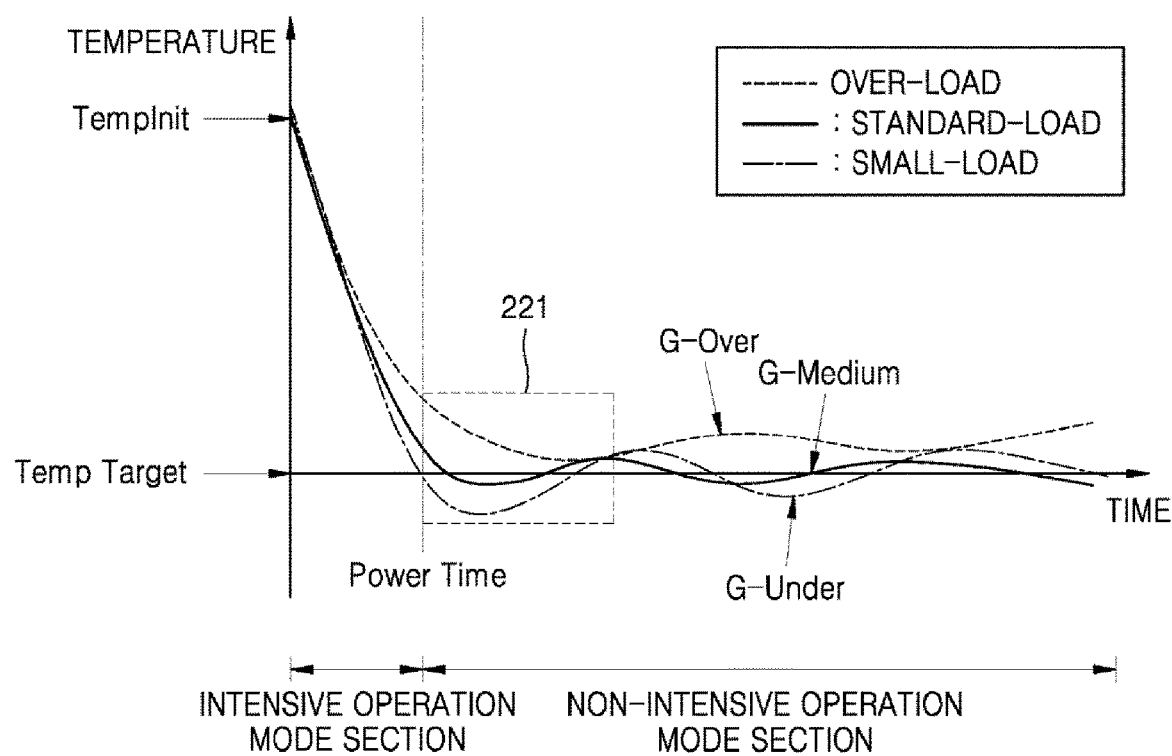
Figure 17:
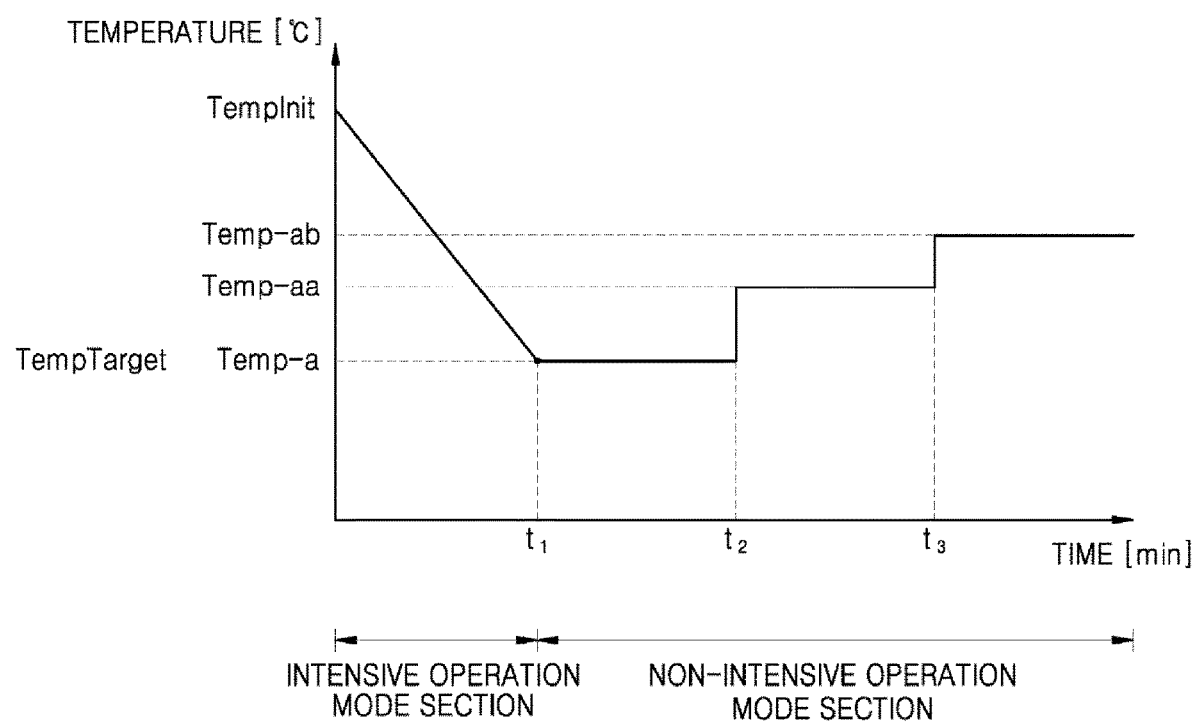

FIGS. 15 to 17 shows examples of a configuration in which an operation mode control module according to the present disclosure operates by selecting an operation mode with an intensive operation mode or a non-intensive operation mode.

The intensive operation mode means a mode of intensively operating so that an indoor temperature quickly reaches a target temperature. The non-intensive operation mode means a mode of operating so that a temperature is maintained or a temperature gradually reaches a target temperature.

According to the present disclosure, the intensive operation mode may be performed only with respect to the intensive air blowing area. According to another example of the present disclosure, the non-intensive operation mode may be performed with respect to the intensive air blowing area and the non-intensive air blowing area. Accordingly, the operation mode control module 170 may instruct the intensive operation mode to be performed for a predetermined period of time with respect to the intensive air blowing area determined by the area recognition module 150. As a result, the air conditioner 100 may operate in the intensive operation mode with respect to the intensive air blowing area.

When the intensive operation mode is terminated, the operation mode control module 170 may instruct the non-intensive operation mode to be performed with respect to the non-intensive air blowing area and the intensive air blowing area. In comparison to the above-described intensive operation mode, an amount of energy consumed per hour in the intensive operation mode may be set to be larger than that in the non-intensive operation mode.

This is because, in the non-intensive operation mode, an amount of energy required to reduce an amount or strength of wind, or to change a temperature of cold wind or warm wind may be reduced. In addition, an amount of energy consumed may be high for a short period of time in the intensive operation mode, but the amount of energy consumed may be gradually reduced for a long period of time in the non-intensive operation mode. As a result, the amount of energy consumed per hour may be calculated to be large in the intensive operation mode. This configuration will be described in more detail.

FIG. 15 is an example in which a parameter generation unit calculates information instructing an operation to be performed in the intensive operation mode by calculating an input factor in the intensive operation mode according to the present disclosure. FIG. 15 shows a temperature change with time with a Y-axis indicating temperature and an X-axis indicating time. FIG. 15, which is an example of an input factor for learning, may be an example of calculation of learning factors such as control information at a product side, a temperature change rate derived from a temperature change with respect to time, etc.

It has been described above that input factors which can be generated by the parameter generation unit 171 may include an initial indoor temperature, target setup temperature, a temperature change rate for initial N minutes, a high-speed section temperature change rate, and time required to reach a target temperature. Here, N may be selected in various ways. In FIG. 15, N may refer to 3 minutes.

FIG. 15 shows that the parameter generation unit 171 may calculate an initial temperature TempInit and a target setup temperature TempTarget. The initial temperature TempInit may be calculated by the sensing unit 173 that senses an initial indoor temperature. The target setup temperature TempTarget may be calculated based on a target setup temperature stored in the operation mode control module 170. The parameter generation unit 171 may calculate a temperature change rate InitRate, for example, for initial three minutes as a/b.

The reference letter "b" means the period of time after the air conditioner operates. For example, "b" may be 3 minutes or 5 minutes. The reference letter "a" means a degree of temperature change from the TempInit over time b.

The high-speed section temperature change rate Power-Rate may also be calculated as c/d. The reference letter "c" means a difference in temperature between the TempTarget and the TempInit. Therefore, "c" may be obtained by the calculation: TempInit−TempTarget. The time required for reaching the target temperature PowerTime may be calculated as d. In some examples, the reference letter "d" means time required for reaching a setup temperature as quickly as possible by performing an operation with a maximum cooling capacity for a maximum of M minutes. In other examples, "d" may include a time scale of 15 minutes or 20 minutes. In some implementations, an over-load, standard-load and small-load may be determined by setting a cooling capacity to be performed in the comfortable mode (second section) at a time point d.

An intensive operation mode section (high-speed mode or high-speed section) means a mode in which the air conditioner operates so as to reach the target temperature after the air conditioner is initially driven. In one example of the intensive operation mode, when initially cooling, a high-speed cooling operation may be performed with a maximum cooling capacity of the air conditioner until a target setup temperature is reached.

In FIG. 15, the target temperature may be set to a specific target temperature value, but a temperature within a predetermined range is also applicable. For example, the target temperature that a current temperature is supposed to reach may be set as 20° C. In another example, it may be determined that the target temperature is reached even when the current temperature reaches a range of +1° C. or −1° C. deviation from 20° C. (i.e. 19° C. to 21° C.).

This configuration may be applied when a time range in which the intensive operation mode section can be operated is predetermined. For example, it is assumed that time for which the air conditioner can operate in a maximum high-speed section (high-speed operable time) is predetermined as 10 minutes or 15 minutes. When the temperature does not reach the target temperature even if the air conditioner starts operating beyond the high-speed operable time, the parameter generation units 110 and 210 may include a currently reached temperature as a learning factor instead of the target temperature.

Thereafter, when the target temperature is reached, the intensive operation mode section (high-speed section) may be changed to the non-intensive operation mode section (comfortable mode or comfortable section). When a predetermined period of time has elapsed or the temperature is close to the target temperature even though the target temperature is not reached, the operation mode of the air conditioner may be changed to the non-intensive operation mode section. One example of the non-intensive operation mode section (comfortable section) may be the comfortable operation, which includes a configuration in which the operation is performed in an auto mode (indirect wind) while maintaining the setup temperature after reaching the target temperature.

A situation where the indoor temperature does not reach the target temperature may correspond to a case where an external influence on the space is large or a space is wide. Therefore, even when the temperature is close to the target temperature to some extent, a mode may be changed from the intensive operation mode section to the non-intensive operation mode section.

Thereafter, the non-intensive operation mode section may select an operation mode different from that of the intensive operation mode section. As described above, the operation mode instruction unit 175 may calculate an operation mode of the air conditioner in the comfortable section by using five learning factors TempInit, TempTarget, InitRate, PowerRate, and PowerTime generated by the parameter generation unit 171.

According to the example described with reference to FIG. 15, a load may be estimated based on environmental factors that can be calculated by the air conditioner. This configuration may include calculating characteristics of a cooling environment of a space where the air conditioner is disposed as various learning factors, and calculating a load based on the learning factors.

In addition, calculation of the load may not be based on a simple function. But, it is possible to calculate an optimum load corresponding to the learning factor by using the deep learning algorithm provided by the learning unit of the external server or the operation mode instruction unit 175 of the operation mode control module 170 of the air conditioner. As a result, the air conditioner may operate by selecting power saving or comfortable cooling according to a load step in the intensive operation mode section.

In some systems, any change in the inner space is not considered after the high-speed section, and thus there may be a problem in that the user controls the temperature in the comfortable section again after the high-speed section ends. By contrast, according to some implementations of the present disclosure, machine-learning (e.g., initial learning and continuous learning) are implemented, and thus the user may maintain a cooling state without any temperature control in a state of the comfortable section.

In particular, in order to provide a comfortable feeling to the user without any control of the air conditioner, the air conditioner may quickly perform cooling (or heating) to reach the vicinity of the target temperature (intensive operation mode section). When the vicinity of the target temperature is reached, the air conditioner may determine whether to maintain the operation mode of the intensive operation mode section while maintaining cooling or heating, to consume more power than power to be used in the operation mode of the non-intensive operation mode section, or to consume less power than the power to be used in the operation mode of the non-intensive operation mode section. In one example, load determination may be performed.

A change in time or temperature, an initial value, a result value, or sizes thereof calculated in the intensive operation mode section described above as a value input to the operation mode instruction unit 175 for the load determination may be used as parameters.

In addition, the operation mode instruction unit 175 may determine an operation method performed in the non-intensive operation mode by reflecting an area occupied by the intensive air blowing area, ratio of the area occupied by the intensive air blowing area to that of the non-intensive air blowing area, location, or the like.

In summary, the operation mode instruction unit 175 may determine the operation method performed in the non-intensive operation mode based on a change sensed in the intensive operation mode section and physical characteristics (area, ratio and location) of the intensive air blowing area and the non-intensive air blowing area, and may determine a current operation condition as over-load, standard-load or small-load condition, or a wind volume and wind speed in the non-intensive operation mode.

The recognition process performed by the operation mode instruction unit 175 may be performed by using the learning unit disposed in the external server. That is, the operation mode instruction unit 175 may use the parameters calculated by the parameter generation unit 171 as input data of the artificial neural network based on a configuration including the artificial neural network that is pre-learned through the machine learning to instruct a load size or air blowing area in the non-intensive operation mode. That is, after operating in the intensive operation mode with respect to the intensive air blowing area, it is possible to determine the over-load, standard-load and/or small-load operation patterns as described with reference to FIG. 16 or the air blowing area in the non-intensive operation mode.

In one example, the deep learning module included in the operation mode instruction unit 175 or the learning unit disposed in the external server may be the deep neural network described with reference to FIG. 5. Information on five learning factors TempInit, TempTarget, InitRate, PowerRate and PowerTime generated by the parameter generation unit 171 and the physical characteristics (area, ratio and location) of the intensive air blowing area and the non-intensive air blowing area may be input as an input value of the input layer, and an output value of the output layer may be output to instruct one of the over-load, standard-load and small-load operation patterns.

The hidden layers and input factors of FIG. 5 may be obtained by collecting chamber (experiment) data for actual usage (field) data and a standard environment test in actual households in order to initially extract input/result factors, and an initial weight value of the hidden layer may be set through pre-learning based thereon.

Thereafter, through the external server, or when the air conditioner 100 provided in the same indoor unit continuously collects the actual usage data, re-learning for the entire data may be applied to cyclically update a weight for each node and each link of the hidden layer.

In one example, it is possible to utilize a clustering technique (unsupervised learning: k-means algorithm) in relation to a load reference classification by performing DB collection for a predetermined period of time when operating the air conditioner to determine an output factor.

In addition, each hidden layer may use a general deep learning method as it is. Alternatively, it is possible to change a structure of each hidden layer for learning or update a weight. For example, the cloud server 300 may compile information provided by a plurality of indoor units into a database, and then may analyze the information to change the layers and nodes of the deep neural network, and a structure of a link. Also, it is possible to sense temperature adjustment of the user within a predetermined period of time in a state of the comfortable section after the target temperature is set, and to reflect the sensed temperature adjustment.

FIG. 16 shows an example of a change of operation modes when an example of the present disclosure is applied.

As described above with reference to FIG. 15, when the air conditioner starts to operate, the parameter generation unit 171 may continuously sense the temperature to calculate a graph as shown in FIG. 15, and the learning factor may be calculated in this process. FIG. 16 shows three different calculation graphs. First, a graph in which the operation mode is calculated as the over-load is indicated by an dashes line (indicated by G-Over), a graph in which the operation mode is calculated as the standard-load is indicated by a solid line (indicated by G-Medium, and a graph in which the operation mode is calculated as the small-load is indicated by an alternate long and short dash line (indicated by G-Under).

The intensive operation mode section may be a section in which an air conditioner sharply reduces the temperature by operating a compressor with a maximum output or a large output within a short period of time. At this time, an air blowing unit 15 may control a lateral angle or vertical angle of the wind so as to operate in the intensive operation mode with respect to the intensive air blowing area. For example, the air conditioner 100 may blow wind in the intensive operation mode only with respect to the intensive air blowing area of FIG. 14.

A time point when the target temperature TempTarget is reached according to a situation of a space or the target temperature is reached with a predetermined difference in temperature may be PowerTime. Up to this point, the parameter generation unit 171 may generate various parameters and provide the parameters to the operation mode instruction unit 175.

The operation mode instruction unit 175 may calculate the operation mode by using the parameters provided at the time point PowerTime. The operation mode instruction unit 175 may analyze a change pattern based on cooling of the intensive operation mode section at a time point indicated by 221. In addition, the air conditioner in the non-intensive operation mode section may select the operation mode that provides a comfortable feeling to the user while reducing power consumption.

When the temperature is not sufficiently reached in the intensive operation mode section according to the change pattern, a lot of time is required to reach the temperature, or an over-load operation mode is calculated by the operation mode instruction unit 175 by reflecting a change rate for initial N minutes, the air conditioner may operate in an over-load mode as shown in the graph indicated by G-Over.

When the target temperature is sufficiently reached in the intensive operation mode section according to the change pattern, time corresponding to a reference value is required to reach the temperature, or a standard-load operation mode is calculated by the operation mode instruction unit 175 by reflecting a change rate for initial N minutes so as to maintain the current temperature or target temperature, the air conditioner may operate in the standard-load mode as shown in the graph indicated by G-Medium.

When the temperature lower than the target temperature is reached in the intensive operation mode section according to the change pattern, a short period of time is required to reach the temperature, or a small-load operation mode is calculated by the operation mode instruction unit 175 by reflecting a change rate for initial N minutes, the air conditioner may operate in the small-load mode as shown in the graph indicated by G-Under.

Even though the target temperature is the same, the air conditioner may operate in a different manner when the change patterns until reaching the target temperature are different. That is, when based on different analysis results of the temperature change pattern based on cooling after reaching the target temperature due to the above-described different learning factors, it is possible to perform an operation mode such as a more appropriate cooling or reducing cooling in response to a condition of an indoor environment.

In some systems, even when cooling (or heating) is performed in the intensive operation mode section in the same way, a situation such as weak cooling (or weak heating) or the over cooling (or over heating) may occur due to different indoor environmental conditions. By contrast, according to some implementations of the present disclosure, cooling (or heating) may be performed in the non-intensive operation mode section suitably for the indoor environmental conditions, thereby maintaining a comfortable indoor environment while reducing energy consumption.

In particular, in the non-intensive operation mode, the air blowing unit 15 may control the lateral angle or vertical angle of the wind so that the air conditioner operates with respect to the intensive air blowing area and the non-intensive air blowing area. For example, the air conditioner 100 may blow wind in the non-intensive operation mode only with respect to the intensive air blowing area and the first non-intensive air blowing area of FIG. 14.

FIG. 17 shows an example of a process in which an operation mode control module controls an operation mode based on a load step. A case where the operation mode is calculated as the small-load is described as one example. The air conditioner may operate in the high-speed mode so that the initial temperature TempInit reaches the target temperature. A time area indicated by the intensive operation mode section in FIG. 17 is in a state before reaching the target setup temperature, and thus the air conditioner may operate in the high-speed mode. In this case, the air conditioner may operate in a cool power mode using the maximum cooling capacity of the air conditioner. In this process, the air conditioner may sense a human body or a space area, thereby lowering the temperature in the space more effectively.

A time area indicated by the non-intensive operation mode section is in a state after reaching the target setup temperature, and thus the air conditioner may operate in the comfortable mode. The operation mode instruction unit 175 or the learning unit of the cloud server according to the present disclosure may determine the operation mode by using the learning factor generated by the parameter generation unit 171 at a time point t1. That is, it is possible to determine a load required for the air conditioner to operate in the non-intensive operation mode section.

As a result of determination, the operation mode may be determined as the small-load and the air conditioner may operate accordingly. The central control unit 110 may control the indoor unit, the outdoor unit and the like so that human body adaptation time is lowered, the temperature is increased, and the wind volume is lowered in the non-intensive operation mode section after the high-speed mode of the intensive operation mode section.

Therefore, after cooling or heating is performed only with respect to the intensive air blowing area in the intensive operation mode section, the cooling or heating may performed with respect to the non-intensive air blowing area in addition to the intensive air blowing area in the non-intensive operation mode section.

In response to the small-load control, the target temperature may partially increase from a temperature Temp-a to a temperature Temp-aa when a time point is changed from t1 to t2. At a time point t3, the target temperature may increase to a temperature Temp-ab and remain at the temperature Temp-ab.

In one example, the target temperature may be automatically set to a temperature mainly used by the user, and the target temperature may be a temperature set by the user most frequently for the latest N times (for example, 20 times). Alternatively, a temperature preferred by the external server based on big data in response to the current temperature may be set as the target temperature.

At the time point t1, a cooling capacity after t1 may be set based on various parameters calculated to reach the target temperature. For example, it is possible to set whether to provide a cooling capacity of the over-load, to provide a cooling capacity of the standard-load, or to provide a cooling capacity of the small-load based on the previously learned information and calculation parameters in a current state.

At subsequent time points t2 and t3, the air conditioner may operate in a power saving mode by gradually adjusting the cooling capacity. When humidity is high in this process, the humidity may be adjusted to a target humidity according to a humidity control linkage. It is also possible to calculate the time points t2 and t3 for increasing the temperature according to a pattern of the user.

Also, in this process, the air blowing area may be classified, and cooling (or heating) may be performed with respect to the classified air blowing area. For example, when the entire space is classified into an intensive air blowing area, a first non-intensive air blowing area (intermittent air blowing area), and a second non-intensive air blowing area (non-air blowing area), the cooling or heating may be performed with respect to the intensive and first non-intensive air blowing area from t1 to t2, and the cooling or heating may be performed with respect to the entire area from t2 to t3.

Although it is not shown in the drawings, when it is determined as the standard-load, the temperature may be increased and the wind volume may be converted into weak wind by reflecting the human body adaptation time under standard conditions. In addition, when it is determined as the over-load, the wind volume may be enhanced without increasing the temperature based on human adaption conditions.

That is, in one example of the present disclosure, the over-load means increasing the wind volume or wind speed. In one example, the small-load means reducing the wind volume or wind speed. In one example, the standard-load means maintaining the wind volume or wind speed.

As an example of the operation mode before and after reaching the target temperature, the operation mode may be divided into an operation mode in which the air conditioner operates with a maximum cooling capacity before reaching the target temperature (intensive operation mode section) and an operation mode in which the air conditioner operates in a customized control manner according to the determined load at the arrival time point t1 after reaching the target temperature (non-intensive operation mode section). Various operation modes may be provided through variableness of the temperature and wind volume for power saving based on a load step estimated at the time point t1 or comfortable cooling.

The operation mode of the air conditioner may be changed to the comfortable mode after the high-speed mode using the maximum cooling capacity by extracting the initial temperature and target temperature when the air conditioner starts to operate and various environmental variables occurring therebetween as learning factors. In this process, the user may control the operation of the air conditioner by selecting an appropriate load so as not to feel that the temperature is warming up.

In process of determining a load by using various environmental factors and operating in the comfortable mode, when an external operation (an operation of increasing or decreasing the temperature or controlling the wind volume) that controls the operation of the air conditioner occurs, the external operation may be input to the operation mode instruction unit 175 so as to be a new result node, thereby estimating the load more accurately.

As shown in FIG. 17, information on the operation mode to be operated in the non-intensive operation mode section may include time information t2 and t3 and temperature information Temp-ab and Temp-aa. In addition, information on the air blowing area may also be included.

Figure 18:
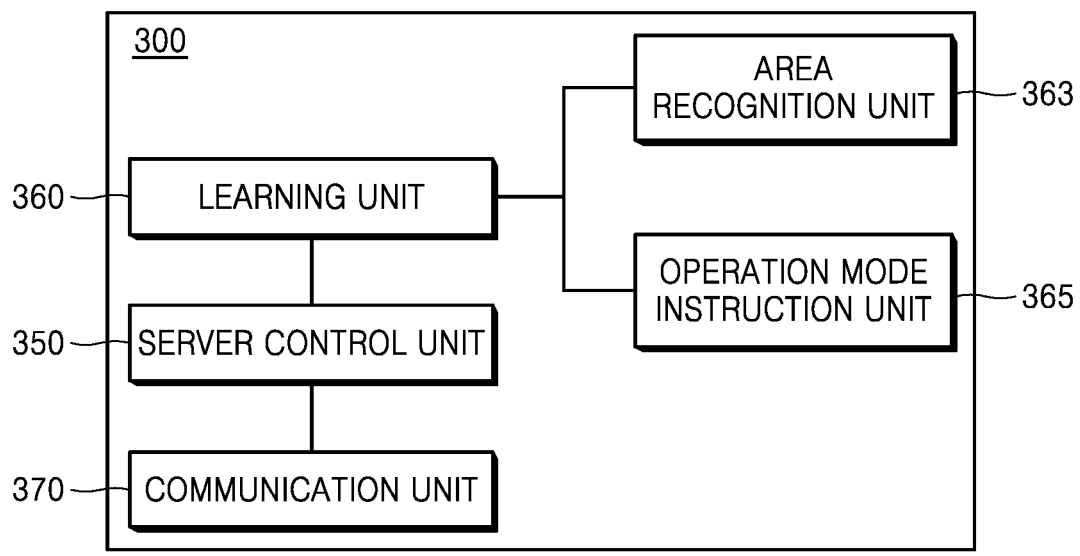
FIG. 18 shows an example of a configuration of a cloud server according to the present disclosure.

FIG. 18 shows an example of a configuration of a cloud server according to the present disclosure. The communication unit 370 may transmit and receive information to and from the air conditioner in a predetermined manner. In FIG. 3, the area recognition unit 153 or the operation mode instruction unit 175 may determine the air blowing area based on the machine learning or determine the operation method (a load size, air blowing area, etc.) performed in the non-intensive operation mode. Determination of the area recognition unit 153 or the operation mode instruction unit 175 may be performed by the cloud server 300, and the learning unit 360 of the cloud server 300 may include the area recognition unit 363 and the operation mode instruction unit 365.

The area recognition unit 363 of the cloud server 300 may classify the air blowing areas into an intensive air blowing area and non-intensive air blowing area by determining the intensive air blowing area based on distance and direction information of the occupant transmitted by the air conditioner, and determining the other area or areas as the non-intensive air blowing area. A detailed operation thereof has been described above.

Also, as described above, the operation mode instruction unit 365 of the cloud server 300 may instruct the air conditioner to operate, after the air conditioner operates in the intensive operation mode with respect to the intensive air blowing area classified by the area recognition unit 363, in the non-intensive operation mode distinguished from the intensive operation mode with respect to the intensive air blowing area and the non-intensive air blowing area.

The operations of the area recognition unit 363 and the operation mode instruction unit 365 may be the same as the operation determined by the area recognition unit 153 or the operation mode instruction unit 175 of FIG. 3. However, there is a difference in that the cloud server 300 receives information from a plurality of air conditioners and determines the air blowing area and non-intensive operating mode based on the information. The server control unit 350 may control the above-described components.

Figure 19:
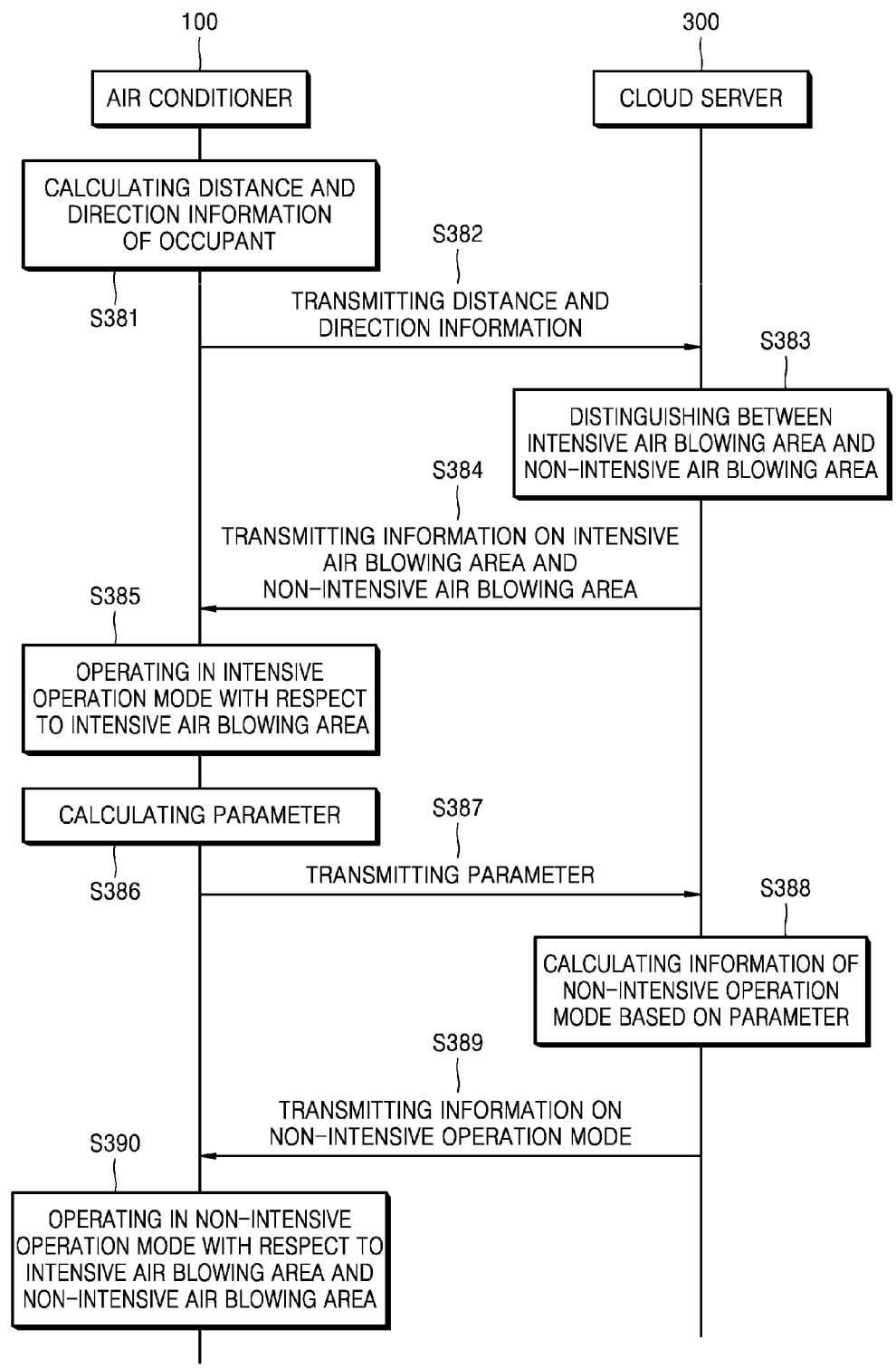
FIG. 19 is a flowchart of an example of an operation process between an air conditioner and a cloud server according to the present disclosure.

FIG. 19 is a flowchart showing an example of an operation process between an air conditioner and a cloud server according to the present disclosure.

The air conditioner 100 may calculate the distance and direction information of the occupant (S381), and may transmit the calculated information to the cloud server 300

(S382). At this time, image information including the distance and the direction information of the occupant may be also one example of information to be transmitted.

The distance and direction information of the occupant received by the communication unit 370 of the cloud server 300 may be provided to the area recognition unit 363 of the cloud server 300. The area recognition unit 363 may classify an air blowable space into the intensive air blowing area and non-intensive air blowing area by determining the intensive air blowing area in the air blowing area of the air conditioner and determining the other area as the non-intensive air blowing area (S383). The communication unit 370 of the cloud server 300 may transmit information on the intensive air blowing area and non-intensive air blowing area to the air conditioner 100 (S384).

Thereafter, the air conditioner 100 may operate in the intensive operation mode with respect to the intensive air blowing area based on the received information (S385). In this process, the parameter generation unit 171 of the air conditioner 100 may generate the above-described type of parameter (S386).

The generated parameter may be transmitted to the cloud server 300 (S387), and the operation mode instruction unit 365 of the cloud server 300 may calculate information of the non-intensive operation mode distinguished from the intensive operation mode with respect to the intensive air blowing area and non-intensive air blowing area of the air conditioner 100 by using the received parameter (S388).

When the communication unit 370 of the cloud server 300 transmits the information on the non-intensive operation mode to the air conditioner (S389), the air conditioner 100 may operate in the non-intensive operation mode with respect to the intensive air blowing area and non-intensive air blowing area (S390). Here, the information may be a size of the load, an intensity of the wind, a temperature of cold air or warn air to be discharged, or the like.

FIG. 20 shows an example of operations of an air blowing unit corresponding to an intensive operation mode and a non-intensive operation mode according to the present disclosure.

The air blowing unit may control a direction of the wind. For example, the air blowing unit 15 may be composed of a left vane and a right vane. Alternately, the air blowing unit 15 may be composed of an upper vane and a lower vane. The left and right vanes may determine a lateral direction of the wind, and the upper and lower vanes may determine a distance of the wind. In the intensive operation mode, the left and right vanes and the upper and lower vanes may fixed toward the intensive air blowing area, or angles thereof may be adjusted laterally or vertically only in the intensive air blowing area. In addition, with respect to the wind direction, it is possible to operate in a strong wind (power wind).

Thereafter, in the non-intensive operation mode, the wind may be blown to the non-intensive air blowing area in addition to the intensive air blowing area. For example, the angles of the right and left vanes and the upper and lower vanes may be adjusted laterally or vertically so that the wind reaches the intensive air blowing area and the intermittent air blowing area.

In particular, when the wind of the air blowing unit 15 is divided into the left vane and the right vane with respect to the center, for example, it can be seen that the left vane and the right vane are distinguished from each other in the air conditioner 100 of FIG. 14. Left and right sides of FIG. 14 may be determined based on a front of the air conditioner.

In this case, the air blowing unit 15 of the air conditioner 100 may divide the air blowing area into a left area 402 and a right area 401 based on a left vane 15b and a right vane 15a, and may independently control the left vane and right vane respectively corresponding to the areas. The central control unit 150 may independently control the left vane 15b and the right vane 15a of the air blowing unit with respect to the intensive air blowing area and the non-intensive air blowing area.

The air blowing area may be divided to left air blowing area and right air blowing area. The left air blowing area may be divided to left intensive air blowing area and left non-intensive air blowing area. The right air blowing area may be divided to right intensive air blowing area and right non-intensive air blowing area.

The air blowing unit 15 of the air conditioner 100 controls the left vane 15b so that the air bypasses the left vane 15b can flow to the left intensive air blowing area. The air blowing unit 15 of the air conditioner 100 controls the right vane 15a so that the air bypasses the right vane 15a can flow to the right intensive air blowing area. The left intensive air blowing area and the right intensive air blowing area may be disposed continuously. The left intensive air blowing area and the right intensive air blowing area may be disposed discontinuously.

When the intensive air blowing area is not determined, the operation mode control module 170 may instruct the intensive operation mode in which the left vane 15b and the right vane 15a operates in a state of being fixed toward the center.

When the intensive air blowing area or the non-intensive blowing area is divided into the left area 402 and the right area 401 and the intensive air blowing area or the non-intensive air blowing area is disposed discontinuously in the left and right areas, the left and right vanes 15a and 15b may be independently controlled. When the intensive air blowing areas are disposed as apart, the left and right vanes 15a and 15b may be independently controlled. When the non-intensive air blowing areas are disposed as apart, the left and right vanes 15a and 15b may be independently controlled. When the left intensive air blowing area and the right intensive air blowing area are not adjacent, or when the left non-intensive air blowing area and the right non-intensive air blowing area are not adjacent, the left and right vanes 15a and 15b may be independently controlled. For example, the space area may be composed of the intensive air blowing area, first non-intensive air blowing area and second non-intensive air blowing area as follows, except the distance information.

Tables 1 to 5 below show an intensive air blowing area H and a first non-intensive air blowing area L in an angular range (5 to 55 degrees) covered by the left vane and an angular range (60 to 105 degrees) covered by the right vane.

TABLE 1

| Left vane | | | | | | | | | | | Right vane | | | | | | | | | |
|---|---|---|---|---|---|---|---|---|---|---|---|---|---|---|---|---|---|---|---|---|
| 5 | 10 | 15 | 20 | 25 | 30 | 35 | 40 | 45 | 50 | 55 | 60 | 65 | 70 | 75 | 80 | 85 | 90 | 95 | 100 | 105 |
| | | | L | L | L | H | H | H | H | H | H | L | L | H | H | H | H | | | |

In a configuration as shown in Table 1, the left vane 15b may be controlled to cover 20 degrees to 55 degrees, and the right vane 15a may be controlled to cover 60 degrees to 90 degrees, and these vanes may be respectively controlled. The left and right vanes 15a and 15b may be independently controlled to cover an area indicated by H in the intensive operation mode and to cover areas indicated by H and L in the non-intensive operation mode.

TABLE 2

| Left vane | | | | | | | | | | | Right vane | | | | | | | | | |
|---|---|---|---|---|---|---|---|---|---|---|---|---|---|---|---|---|---|---|---|---|
| 5 | 10 | 15 | 20 | 25 | 30 | 35 | 40 | 45 | 50 | 55 | 60 | 65 | 70 | 75 | 80 | 85 | 90 | 95 | 100 | 105 |
| | | | | | | | | | | | | L | H | H | H | H | | | | |

In a configuration as shown in Table 2, it can be seen that the intensive air blowing area is not set since the left vane 15b have no H and L. Therefore, the left vane 15b may operate in a state of being fixed to face the center, and the right vane 15a may be controlled to cover 70 degrees to 90 degrees, and these vanes may be respectively controlled.

In Table 2, the intensive air blowing area H may be composed of an left intensive air blowing area (an area in 402 of FIG. 14) and a right intensive air blowing area (an area in 401 of FIG. 14), and the left intensive air blowing area and the right intensive air blowing area may not be continuous as shown in Table 2.

The central control unit 150 may control the left vane to blow air into the left intensive air blowing area, and may control the right vane to blow air into the right intensive air blowing area. When the intensive air blowing area is not disposed on either side, a corresponding sided vane may be controlled to face the center. In Table 2, the right vane may be controlled to correspond to the intensive air blowing area of 75 to 90 degrees, and the left vane may face the center.

This configuration may be applied to the non-intensive air blowing area (air blowing area of the non-intensive operation mode in addition to H and L) in the same way. That is, the non-intensive air blowing area may be composed of a left non-intensive air blowing area (an area in 402 of FIG. 14) and a right non-intensive air blowing area (an area in 401 of FIG. 14), and the left non-intensive air blowing area and right non-intensive air blowing area may not be continuous as shown in Table 2.

The central control unit 150 may control the left vane to blow air into the left non-intensive air blowing area, and may control the right vane to blow air into the right non-intensive air blowing area. When the non-intensive air blowing area is not disposed on either side, a corresponding sided vane may be controlled to face the center. In Table 2, the right vane may be controlled to correspond to the intensive air blowing area of 70 to 90 degrees, and the left vane may face the center.

In summary, when one of the left area 402 and the right area 401 is not included in the intensive air blowing area based on FIG. 14, the operation mode control module 170 or the central control unit 150 may control the vane of the un-included area (left or right side) by fixing the vane to the center.

TABLE 3

| Left vane | | | | | | | | | | | Right vane | | | | | | | | | |
|---|---|---|---|---|---|---|---|---|---|---|---|---|---|---|---|---|---|---|---|---|
| 5 | 10 | 15 | 20 | 25 | 30 | 35 | 40 | 45 | 50 | 55 | 60 | 65 | 70 | 75 | 80 | 85 | 90 | 95 | 100 | 105 |
| | L | L | L | H | H | H | | | | | | L | H | | | H | | | | |

In a configuration as shown in Table 3, the left vane 15b may be controlled to cover 20 degrees to 45 degrees, and the right vane 15a may be controlled to cover 70 degrees to 90 degrees, and these vanes may be respectively controlled.

TABLE 4

| Left vane | | | | | | | | | | | Right vane | | | | | | | | | |
|---|---|---|---|---|---|---|---|---|---|---|---|---|---|---|---|---|---|---|---|---|
| 5 | 10 | 15 | 20 | 25 | 30 | 35 | 40 | 45 | 50 | 55 | 60 | 65 | 70 | 75 | 80 | 85 | 90 | 95 | 100 | 105 |
| | L | L | L | H | H | H | H | | | | | | | | | H | H | | | |

In the configuration as shown in Table 4, the left vane 15b may be controlled to cover 20 degrees to 55 degrees, and the right vane 15a may be controlled to cover 85 degrees to 90 degrees, and these vanes may be respectively controlled. In this process, when an angle at which the left or right vane is rotatable is equal to or less than 10 degrees (for example, a rotation angle of the right vane in Table 4 is 85 to 90 degrees), the left vane or right vane may be fixed toward the intensive air blowing area or non-intensive air blowing area. In Table 4, the right vane may be fixed toward 85 to 90 degrees.

TABLE 5

| Left vane | | | | | | | | | | | Right vane | | | | | | | | | |
|---|---|---|---|---|---|---|---|---|---|---|---|---|---|---|---|---|---|---|---|---|
| 5 | 10 | 15 | 20 | 25 | 30 | 35 | 40 | 45 | 50 | 55 | 60 | 65 | 70 | 75 | 80 | 85 | 90 | 95 | 100 | 105 |

As shown in Table 5, when the intensive and non-intensive air blowing areas are not disposed in both the left and right areas, the left vane 15b and the right vane 15a may operate in a full swing. Alternately, in the intensive operation mode, the left vane 15b and the right vane 15a may be controlled toward the center, and in the non-intensive operation mode, the left vane 15b and the right vane 15a may operate in the full swing covering a range of 5 to 105 degrees from left to right. The following is a summary of Tables 1 to 5.

The intensive air blowing area (or the non-intensive blowing area) may be divided into the left intensive air blowing area (area in 402) in which a wind direction is determined by control of the left vane 15b and the right intensive air blowing area (area in 401) in which a wind direction is determined by control of the right vane 15b. The operation mode control module 170 or the central control unit 150 may control a left wind direction by adjusting the left vane toward the left intensive air blowing area and may control a right wind direction by adjusting the right vane toward the right intensive air blowing area.

Numeral 231 of FIG. 20 shows an operation mode in which air is blown to the intensive air blowing area in the intensive operation mode section. Lateral movement angles of the right and left vanes and vertical movement angles of the upper and lower vanes of the air blowing unit may be determined so as to be suitable for the intensive air blowing area.

Numeral 232 shows an operation mode in which air is blown to the intensive air blowing area and the first non-intensive blowing area in the non-intensive operation mode section. It can be seen that lateral air blowing angles and vertical angle are much increased in comparison to 231. The non-intensive operation mode may also operate with a different wind volume than that of the intensive operation mode. For example, the non-intensive operation mode may operate with a weak wind or a breeze.

In the present disclosure, the intensive operation mode and the non-intensive operation mode may be implemented in various ways. For example, in the intensive operation mode, it is possible to blow air only to the intensive air blowing area. In contrast, in the non-intensive operation mode, it is also possible to intermittently blow air to the non-intensive air blowing area in addition to the intensive air blowing area.

For example, in the intensive operation mode, the number of times of operations as shown in numeral 231 may be 10 times and the number of times of operations as shown in numeral 232 may be 3 times. But, in the non-intensive operation mode, the number of times of operations as shown in numeral 231 may be 5 times, and the number of times of operations as shown in numeral 232 may be 10 times. That is, although mainly described above with respect to the example in which air is blown to the intensive air blowing area in the intensive operation mode, air may be blown to an adjacent area or another area in various modified ways.

As shown in FIGS. 15 to 17, the air conditioner may operate in the intensive operation mode, and then may operate in the non-intensive operation mode based on the calculated information. In the non-intensive operation mode, air may be blown to an air blowing area different from the air blowing area in which the air conditioner operates in the intensive operation mode, and thus it is possible to intensively blow air only with respect to an area where a large number of people are present or a temperature needs to reach a target temperature quickly for a predetermined period of time based on an initial or specific time point, and to blow air over a wider area from that point, thereby performing a high-speed operation in a short period of time and performing a comfortable operation for maintaining a temperature around the target temperature.

Therefore, it is possible to distinguish the intensive air blowing area (residing area) from the non-residing area or activity area based on information on the occupant and a location of the occupant (distance, angle, etc.) confirmed by the camera, thereby controlling the airflow to the intensive air blowing area and adjusting the number of rotations of the fan motor installed in a main body, angle of the louver, angle of the guide, and wind volume.

In addition, after operating in the intensive operation mode with respect to the intensive air blowing area, it is possible to operate in the non-intensive operation mode based on the calculated temperature, humidity, area width, location, or the like. For this purpose, it is possible to perform a comfortable control by using direct or indirect airflow, and adaptively adjust a wind direction or wind speed by determining a cooling or heating load based on a distance between the actual user's activity area (air blowing area) and the air conditioner.

Even if it was described above that all of the components of an implementation of the present disclosure are coupled as a single unit or coupled to be operated as a single unit, the present disclosure is not necessarily limited to such an implementation. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by a person skilled in the technical field of the present disclosure. Such a computer program may implement the implementations of the present disclosure by being stored in a computer readable storage medium, and being read and executed by a computer. A magnetic recording medium, an optical recording medium, a carrier wave medium, or the like may be employed as the storage medium. Also, a computer program to implement an implementation of the present disclosure may include a program module that is transmitted in real time via an external device.

What is claimed:

1. An air conditioner comprising:
    at least one camera;
    at least one processor; and
    at least one computer memory operably connectable to the at least one processor and storing instructions that, when executed by the at least one processor, perform operations comprising:
    obtaining at least one image acquired by the at least one camera;
    determining a distance and a direction of an occupant relative to the air conditioner, based on the at least one image;
    classifying an air-blowable space of the air conditioner into an intensive air blowing area and a non-intensive air blowing area, based on the distance and the direction of the occupant relative to the air conditioner through machine learning;
    controlling the air conditioner to operate in an intensive operation mode with respect to the intensive air blowing area; and
    controlling the air conditioner to operate in a non-intensive operation mode with respect to the intensive air blowing area and the non-intensive air blowing area based on completion of the intensive operation mode,
    wherein a time duration associated with the intensive operation mode is smaller than a time duration associated with the non-intensive operation mode,
    wherein the air conditioner further comprises an air blowing unit comprising a left vane and a right vane, and
    wherein the operations further comprise:
        independently controlling the left vane and the right vane of the air blowing unit to supply air with respect to the intensive air blowing area and the non-intensive air blowing area:
        based on a determination that an angle at which the left vane or the right vane rotates with respect to the intensive air blowing area or the non-intensive air blowing area is less than a threshold angle: fixing the left vane or the right vane toward the intensive air blowing area or the non-intensive air blowing area, and
        based on a determination that there is no intensive air blowing area in the air- blowable space of the air conditioner: controlling the left vane and the right vane to swing.

2. The air conditioner of claim 1, wherein the operations further comprise:
    identifying a presence of the occupant in the at least one image acquired by the at least one camera through machine learning;
    determining the distance and the direction of the occupant relative to the air conditioner based on the at least one image through machine learning; and
    identifying an activity area with respect to a plurality of areas based on the distance and the direction of the occupant relative to the air conditioner through machine learning.

3. The air conditioner of claim 2, wherein the operations further comprise:
    generating histogram values corresponding to the plurality of areas by accumulating a result of the distance and the direction of the occupant; and
    processing the histogram values as input data to classify the air-blowable space into the intensive air blowing area and the non-intensive air blowing area.

4. The air conditioner of claim 1, wherein the operations further comprise:
    classifying the non-intensive air blowing area into an intermittent air blowing area and an non-air blowing area through machine learning.

5. The air conditioner of claim 1, wherein the operations further comprise:
    based on a determination that there is no intensive air blowing area in the air-blowable space, controlling the air conditioner to operate in an intensive operation mode in which the left vane and the right vane operate in a state of being fixed toward a central direction of the air conditioner.

6. The air conditioner of claim 1, wherein the operations further comprise:
    based on a determination that the intensive air blowing area comprises a left intensive air blowing area and a right intensive air blowing area, and that the left intensive air blowing area and the right intensive air blowing area are not continuous:
    controlling the left vane to blow air to the left intensive air blowing area, and controlling the right vane to blow air to the right intensive air blowing area.

7. The air conditioner of claim 1, wherein independently controlling the left vane and the right vane comprises:
    controlling the left vane to blow air to a left area, and controlling the right vane to blow area to a right area; and
    based on a determination that any one of the left area or the right area is not included in the intensive air blowing area: controlling the any one of the left vane or the right vane to be fixed toward a central direction of the air conditioner.

8. The air conditioner of claim 1, wherein independently controlling the left vane and the right vane comprises:
    determining that the intensive air blowing area comprises (i) a left intensive air blowing area in which a first wind direction is determined by control of the left vane, and (ii) a right intensive blowing area in which a second wind direction is determined by control of the right vane; and
    controlling a left wind direction by adjusting the left vane toward the left intensive air blowing area, and controlling a right wind direction by adjusting the right vane toward the right intensive air blowing area.

9. The air conditioner of claim 1, wherein the operations further comprise:
    based on a determination of the intensive air blowing area, controlling the air conditioner to operate in the intensive operation mode, with respect to the intensive air blowing area, for a first period of time; and
    based on termination of the intensive operation mode, controlling the air conditioner to operate in the non-intensive operation mode with respect to the non-intensive air blowing area and the intensive air blowing area,
    wherein a first amount of energy consumed per unit time during the intensive operation mode is greater than a second amount of energy consumed per unit time during the non-intensive operation mode.

10. The air conditioner of claim 1, wherein the air conditioner further comprises a sensing unit configured to sense a change in a temperature or a humidity of the air blowing area, and
    wherein the operations further comprise:
        generating a parameter corresponding to at least one of (i) locations and areas of the non-intensive air blowing area and the intensive air blowing area, (ii) an initial indoor temperature at a start time of a section in which the air conditioner operates in the intensive operation mode, (iii) a target setup temperature of the section, (iv) a temperature change rate of a predetermined initial section of the section, (v) a temperature change rate of the section, or (vi) a time scale between a start time point and an end time point of the section;

controlling the air conditioner to operate in the intensive operation mode for a predetermined period of time with respect to the intensive air blowing area based on an activation time point, wherein the activation time point is at least one of (i) a turn-on time of the air conditioner, or (ii) a starting time of an automatic operation mode of air-conditioner without user control; and controlling the air conditioner to operate in the non-intensive operation mode with respect to the non-intensive air blowing area and the intensive air blowing area based on the intensive operation mode being terminated.

11. A cloud server configured to implement an area-selective operation of an air conditioner, the cloud server comprising:

a communication unit configured to transmit and receive information to and from the air conditioner;

at least one processor; and at least one computer memory operably connectable to the at least one processor and storing instructions that, when executed by the at least one processor, perform operations comprising:

receiving, from the air conditioner via the communication unit, information related to a distance and a direction of an occupant relative to the air conditioner;

classifying an air-blowable space of the air conditioner into an intensive air blowing area and a non-intensive air blowing area, based on the information related to the distance and the direction of the occupant relative to the air conditioner through machine learning; and instructing the air conditioner to operate, after the air conditioner operates in an intensive operation mode with respect to the intensive air blowing area, in a non-intensive operation mode with respect to the intensive air blowing area and the non-intensive air blowing area;

wherein the air conditioner further comprises an air blowing unit comprising a left vane and a right vane, and wherein the operations further comprise: independently controlling the left vane and the right vane of the air blowing unit to supply air with respect to the intensive air blowing area and the non-intensive air blowing area; and wherein the operations further comprise:

based on a determination that an angle at which the left vane or the right vane rotates with respect to the intensive air blowing area or the non-intensive air blowing area is less than a threshold angle: fixing the left vane or the right vane toward the intensive air blowing area or the non-intensive air blowing area, and based on a determination that there is no intensive air blowing area in the air-blowable space of the air conditioner: controlling the left vane and the right vane to swing.

12. The cloud server of claim 11, wherein the information related to the distance and the direction of the occupant relative to the air conditioner comprises at least one image acquired by at least one camera disposed in the air conditioner, and wherein the operations further comprise:

identifying a presence of the occupant in the at least one image through machine learning;

determining the distance and the direction of the occupant relative to the air conditioner based on the at least one image through machine learning; and identifying an activity area with respect to a plurality of areas based on the distance and the direction of the occupant relative to the air conditioner through machine learning.

13. The cloud server of claim 12, wherein the operations further comprise:

generating histogram values corresponding to the plurality of areas by accumulating a result of the distance and the direction of the occupant; and processing the histogram values as input data to classify the air-blowable space into the intensive air blowing area and the non-intensive air blowing area.

14. The cloud server of claim 11, wherein the operations further comprise:

classifying the non-intensive air blowing area into an intermittent air blowing area and an non-air blowing area through machine learning.

15. The cloud server of claim 11, wherein the operations further comprise:

instructing the air conditioner to operate in the intensive operation mode for a predetermined period of time with respect to the intensive air blowing area based on an activation time point, wherein the activation time point is at least one of (i) a turn-on time of the air conditioner, or (ii) a starting time of an automatic operation mode of air-conditioner without user control; and instructing the air conditioner to operate in the non-intensive operation mode with respect to the non-intensive air blowing area and the intensive air blowing area based on the intensive operation mode being terminated, wherein instructing the air conditioner to operate in the intensive operation mode and the non-intensive operation mode is based on at least one of (i) locations and areas of the non-intensive air blowing area and the intensive air blowing area, (ii) an initial indoor temperature at a start time of a section in which the air conditioner operates in the intensive operation mode, (iii) a target setup temperature of the section, (iv) a temperature change rate of a predetermined initial section of the section, (v) a temperature change rate of the section, or (vi) a time scale between a start time point and an end time point of the section.

16. A method of operating an air conditioner, comprising:

obtaining at least one image acquired by at least one camera;

determining a distance and a direction of an occupant relative to the air conditioner, based on the at least one image;

classifying an air-blowable space of the air conditioner into an intensive air blowing area and a non-intensive air blowing area, based on the distance and the direction of the occupant relative to the air conditioner through machine learning;

controlling the air conditioner to operate in an intensive operation mode with respect to the intensive air blowing area; and controlling the air conditioner to operate in a non-intensive operation mode with respect to the intensive air blowing area and the non-intensive air blowing area based on completion of the intensive operation mode, wherein a time duration associated with the intensive operation mode is smaller than a time duration associated with the non-intensive operation mode;

wherein the air conditioner further comprises an air blowing unit comprising a left vane and a right vane, and wherein the operations further comprise: independently controlling the left vane and the right vane of the air blowing unit to supply air with respect to the intensive air blowing area and the non-intensive air blowing area; and wherein the operations further comprise:
  based on a determination that an angle at which the left vane or the right vane rotates with respect to the intensive air blowing area or the non-intensive air blowing area is less than a threshold angle: fixing the left vane or the right vane toward the intensive air blowing area or the non-intensive air blowing area, and
  based on a determination that there is no intensive air blowing area in the air-blowable space of the air conditioner: controlling the left vane and the right vane to swing.

17. The method of claim 16, further comprising:
identifying a presence of the occupant in the at least one image acquired by the at least one camera;
determining the distance and the direction of the occupant relative to the air conditioner based on the at least one image through machine learning; and
identifying an activity area with respect to a plurality of areas based on the distance and the direction of the occupant relative to the air conditioner through machine learning.

18. The method of claim 17, wherein the method further comprises:
generating histogram values corresponding to the plurality of areas by accumulating a result of the distance and the direction of the occupant; and
processing the histogram values as input data to classify the air-blowable space into the intensive air blowing area and the non-intensive air blowing area.

* * * * *